(12) United States Patent
Choi et al.

(10) Patent No.: US 10,134,540 B2
(45) Date of Patent: Nov. 20, 2018

(54) ELECTRONIC DEVICE INCLUDING WATERPROOF STRUCTURE

(71) Applicant: Samsung Electronics Co., Ltd., Gyeonggi-do (KR)

(72) Inventors: Jong-Min Choi, Seongnam-si (KR);
Daehyeong Park, Seongnam-si (KR);
Young-Sik Choi, Hwaseong-si (KR);
Byoung-Uk Yoon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/633,667

(22) Filed: Jun. 26, 2017

(65) Prior Publication Data

US 2018/0033571 A1 Feb. 1, 2018

(30) Foreign Application Priority Data

Jul. 29, 2016 (KR) ........................ 10-2016-0097176

(51) Int. Cl.
| | |
|---|---|
| *H04M 1/00* | (2006.01) |
| *H01H 13/06* | (2006.01) |
| *G06F 3/02* | (2006.01) |
| *H04M 1/18* | (2006.01) |
| *H04M 1/23* | (2006.01) |

(Continued)

(52) U.S. Cl.
CPC .......... *H01H 13/06* (2013.01); *G06F 1/1637* (2013.01); *G06F 1/1656* (2013.01); *G06F 1/203* (2013.01); *G06F 3/0202* (2013.01); *H04B 1/3888* (2013.01); *H04M 1/0202* (2013.01); *H04M 1/0266* (2013.01); *H04M 1/18* (2013.01);

(Continued)

(58) Field of Classification Search
CPC ..... H01H 13/06; H01H 2213/00; H04M 1/18;
H04M 1/23; G06F 3/0202; H04B 1/00
USPC ............................................... 455/566, 575.8
See application file for complete search history.

(56) References Cited

U.S. PATENT DOCUMENTS

2006/0159840 A1 7/2006 Ikagawa
2008/0239642 A1 10/2008 Kanbayashi
(Continued)

FOREIGN PATENT DOCUMENTS

JP 2008241805 A 10/2008
JP 2013243497 A 12/2013
(Continued)

OTHER PUBLICATIONS

International Search Report and Written Opinion for International Application No. PCT/KR2017/006795, dated Nov. 10, 2017. (9 pages).

(Continued)

*Primary Examiner* — Eugene Yun

(57) ABSTRACT

An electronic device including a waterproof structure is provided. The electronic device includes a housing, a window arranged in at least a part of the housing, a display module arranged in a rear surface of the window, a heat radiating member arranged in a rear surface of the display module, a polymer member arranged between a first surface of the heat radiating member and the rear surface of the display module, and a conductive member arranged in a second surface of the heat radiating member facing the first surface of the heat radiating member. A waterproof structure for the heat radiating member may be configured using at least one of the polymer member or the conductive member.

20 Claims, 41 Drawing Sheets

(51) Int. Cl.
*G06F 1/16* (2006.01)
*G06F 1/20* (2006.01)
*H04B 1/3888* (2015.01)
*H04M 1/02* (2006.01)
*H04B 1/00* (2006.01)
*H04B 1/38* (2015.01)

(52) U.S. Cl.
CPC .......... *H04M 1/23* (2013.01); *H01H 2213/00* (2013.01); *H04B 1/00* (2013.01); *H04B 2001/3894* (2013.01)

(56) References Cited

U.S. PATENT DOCUMENTS

| | | |
|---|---|---|
| 2013/0058018 A1 | 3/2013 | Song et al. |
| 2013/0120227 A1 | 5/2013 | Tanikawa |
| 2013/0176700 A1 | 7/2013 | Stevens et al. |
| 2014/0177154 A1 | 6/2014 | Lee et al. |
| 2016/0066412 A1 | 3/2016 | Choi et al. |
| 2016/0192523 A1 | 6/2016 | Lin et al. |

FOREIGN PATENT DOCUMENTS

| | | |
|---|---|---|
| JP | 2015092644 A | 5/2015 |
| KR | 20130054152 A | 5/2013 |
| KR | 103955358 B1 | 5/2014 |
| KR | 20140080068 A | 6/2014 |
| KR | 20150069705 A | 6/2015 |

OTHER PUBLICATIONS

Communication from a foreign patent office in a counterpart foreign application, European Patent Office, "Partial European Search Report," Application No. EP 17177726.1, Apr. 23, 2018, 7 pages.

US 10,134,540 B2

ELECTRONIC DEVICE INCLUDING WATERPROOF STRUCTURE

CROSS-REFERENCE TO RELATED APPLICATION(S) AND CLAIM OF PRIORITY

The present application is related to and claims the priority under 35 U.S.C. § 119(a) to Korean Application Serial No. 10-2016-0097176, which was filed in the Korean Intellectual Property Office on Jul. 29, 2016, the entire content of which is hereby incorporated by reference.

TECHNICAL FIELD

Various exemplary embodiments of the present invention relate to an electronic device and, for example, relate to an electronic device including a waterproof structure.

BACKGROUND

As a functional difference is significantly reduced every manufacturing company, electronic devices are getting slimmer to meet consumers' needs for purchase, and are being developed to increase the rigidities of the electronic devices, and enhance the design aspects thereof and simultaneously differentiate functional elements thereof.

A waterproof function can be of much importance to electronic devices which are miniaturized and whose carriage becomes popular. For the purpose of the waterproof function, the electronic device can include at least one seal member that is arranged therein. According to one exemplary embodiment, the seal member can be designed in consideration of an efficient arrangement relationship with other components within the electronic device.

SUMMARY

For a waterproof function, an electronic device can include at least one seal member that is arranged therein. According to one exemplary embodiment, the seal member can be interposed between at least two housings (e.g., a bracket, a housing, a display module or the like) of the electronic device. If the corresponding housings are combined with each other, it can implement the waterproof function in a manner of making airtight an internal space of the electronic device.

In case where the electronic device includes a display that has a window and a display module arranged in a rear surface of the window, the seal member can be arranged along an edge of the window other than the display module. The seal member arranged at the edge of the window can be attached to an edge of another housing. This arrangement scheme of the seal member needs to separately prepare a seal member arrangement region in addition to a display module arrangement region at the edge of the window. This can act as a factor of expanding a Black Matrix (BM) region (e.g., a bezel region, etc.) of the display or obstructing the scale-down of the BM region.

According to various exemplary embodiments, at least a part of the seal member may be interposed between a rear surface of the display and the housing. By an arrangement structure of the seal member arranged in the rear surface of the display, an electronic device having a BM region having a relatively narrow width may be implemented.

According to various exemplary embodiments, as mentioned above, the seal member is arranged between internal constituent elements (e.g., a display module) of the electronic device and the housing. Regarding this, owing to a step between the window and the display module, the seal member can be divided into a majority of pieces and attached to the housing, thereby implementing waterproof. But, moisture is infiltrated between the divided seal members and is held a long time, so the performance of peripheral components (e.g., the seal member) exposed to moisture over long time may be deteriorated.

According to various exemplary embodiments, the seal member is interposed between the display and the housing. So, this can cause a problem that moisture can be introduced into a side surface of the display and, although this moisture is not introduced into the electronic device, the display module of the display and laminated members (e.g., an absorbing member, a shielding member, a heat radiating member, etc.) laminated on a rear surface of the display module can selectively employ materials capable of enduring moisture exposed to the side surface of the display. Particularly, a problem can occur in which a non-waterproof member (e.g., a moisture sensitive member) cannot be employed if it is of materials having an excellent heat radiating function but being vulnerable to moisture.

Various exemplary embodiments of the present invention may provide an electronic device including a waterproof structure.

Various exemplary embodiments of the present invention may provide an electronic device including a waterproof structure such that a non-waterproof member arranged in the electronic device is not exposed to moisture.

Various exemplary embodiments of the present invention may provide an electronic device including a waterproof structure that is implemented such that moisture infiltrated into the electronic device is not kept long time even if a waterproof function is implemented.

According to various exemplary embodiments, an electronic device may include a housing, a window arranged in at least a part of the housing, a display module arranged in a rear surface of the window, a heat radiating member arranged in a rear surface of the display module, a polymer member arranged between a first surface of the heat radiating member and the rear surface of the display module, and a conductive member arranged in a second surface of the heat radiating member facing the first surface of the heat radiating member. A waterproof structure for the heat radiating member may be configured using at least one of the polymer member and the conductive member.

According to various exemplary embodiments, an electronic device may include a housing, a window arranged in at least a partial region of the housing, a display module attached to a rear surface of the window, a first member arranged in a rear surface of the display module, a second member arranged in a rear surface of the first member, and a third member arranged between the first member and the second member, and waterproof processed or waterproofed by at least one member among the first member and the second member. The first member and/or the second member may have a relatively superior waterproof performance than the third member.

According to various exemplary embodiments, an electronic device may include a housing, a window arranged in at least a partial region of the housing, a display module attached to a rear surface of the window, an absorbing member attached to a rear surface of the display module, a graphite member for heat radiation, attached to a rear surface of the absorbing member, and a copper member arranged beneath the graphite member, and joined to at least a part of the absorbing member. The graphite member may be configured to have a waterproof structure that prevents the infiltration of external moisture by a junction structure between the absorbing member and the copper member.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
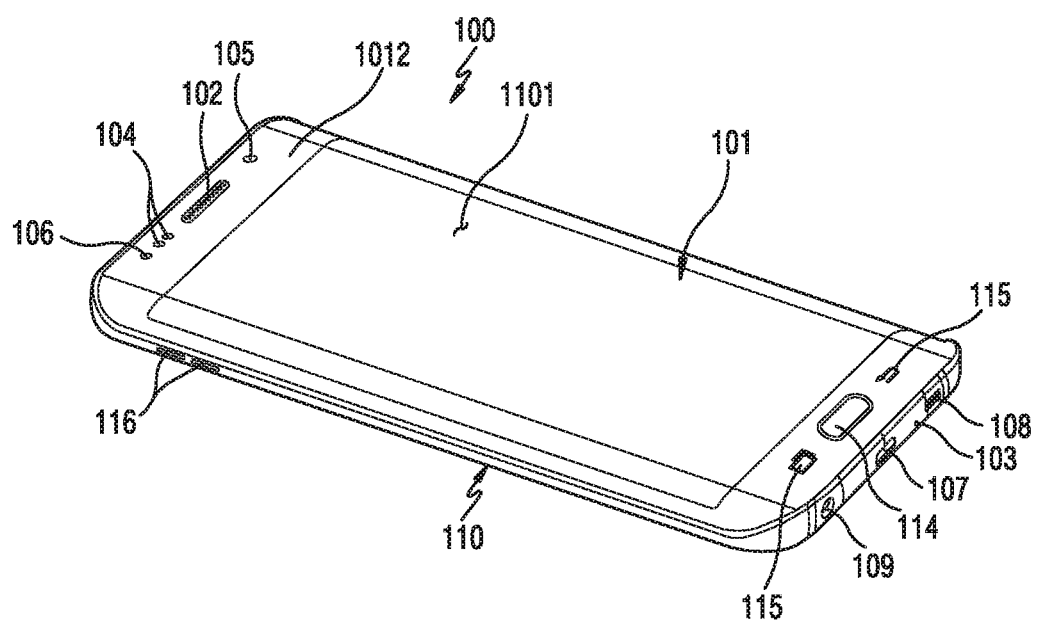
FIG. 1 is a front perspective diagram of an electronic device according to various exemplary embodiments of the present invention.

FIGS. 1 through 12D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Various exemplary embodiments of the present document are mentioned below with reference to the accompanying drawings. However, these do not intend to limit a technology mentioned in the present document to a specific embodiment form, and it should be understood to include various modifications, equivalents and/or alternatives of various exemplary embodiments of the present document. In relation to a description of the drawing, like reference symbols can denote like constituent elements.

In the present document, the expressions "have", "may have", "comprise", "may comprise", etc. indicate the existence of a corresponding feature (e.g., a numeral value, a function, an operation, a constituent element such as a component or the like), and do not exclude the existence of an additional feature.

In the present document, the expressions "A or B", "at least one of A or/and B", "one or more of A or/and B" or the like may include all available combinations of words enumerated together. For example, "A or B", "at least one of A and B", or "at least one of A or B" can denote all of the cases of (1) including at least one A, (2) including at least one B, or (3) including all of at least one A and at least one B.

The expressions "first", "second" or the like used in the present document may modify various constituent elements irrespective of order and/or importance, but are merely used to distinguish one constituent element from another constituent element and do not intend to limit the corresponding constituent elements. For example, a first user device and a second user device can represent mutually different user devices regardless of order or importance. For example, a first constituent element can be named a second constituent element without departing from the scope of right mentioned in the present document. Similarly, even the second constituent element can be interchangeably named the first constituent element.

When it is mentioned that some constituent element (e.g., a first constituent element) is "(operatively or communicatively) coupled with/to" or is "connected to" another constituent element (e.g., a second constituent element), it will have to be understood that the some constituent element can be directly coupled to the another constituent element, or be coupled to the another constituent element through a further constituent element (e.g., a third constituent element). On the other hand, when it is mentioned that some constituent element (e.g., a first constituent element) is "directly coupled" or is "directly connected" to another constituent element (e.g., a second constituent element), it can be understood that a further constituent element (e.g., a third constituent element) does not exist between the some constituent element and the another constituent element.

The expression "configured (or set) to~" used in the present document can be used interchangeably with, for example, "suitable for~", "having the capacity to~", "designed to~", "adapted to~", "made to~", or "capable of~" in accordance to context. The term "configured (or set) to~" may not necessarily mean only "specifically designed to" in hardware. Instead, in some context, the expression "device configured to~" can represent that the device is "capable of~" together with other devices or components. For example, the phrase "processor configured (or set) to perform A, B, and C" may represent an exclusive processor (e.g., an embedded processor) for performing a corresponding operation, or a generic-purpose processor (e.g., a Central Processing Unit (CPU) or an Application Processor (AP)) executing one or more software programs stored in a memory device, thereby being capable of performing corresponding operations.

The terms used in the present document are used to just describe specific exemplary embodiments, and have not an intention to limit the scope of other exemplary embodiments. The expression of a singular form may include the expression of a plural form unless otherwise dictating clearly in context. The terms used herein inclusive of technological or scientific terms may have the same meaning as those commonly understood by a person having ordinary skill in the art mentioned in the present document. Among the terms used in the present document, the terms defined in a general dictionary may be construed as having the same or similar meanings with the contextual meanings of a related technology. And, the terms defined in the general dictionary are not construed as having ideal or excessively formal meanings unless defined clearly in the present document. According to cases, even the terms defined in the present document may not be construed as excluding exemplary embodiments of the present document.

An electronic device according to various exemplary embodiments of the present document may include at least one of a smartphone, a tablet Personal Computer (PC), a mobile phone, a video phone, an electronic book (e-book) reader, a desktop PC, a laptop PC, a netbook computer, a workstation, a server, a Personal Digital Assistant (PDA), a Portable Multimedia Player (PMP), a Moving Picture Experts Group (MPEG-1 or MPEG-2) Audio Layer 3 (MP3) player, a mobile medical device, a camera, or a wearable device. According to various exemplary embodiments, the wearable device may include at least one of an accessory type (e.g., a watch, a ring, a wristlet, an anklet, a necklace, glasses, a contact lens, or a Head-Mounted-Device (HMD), etc.), a fabric or clothing integrated type (e.g., electronic clothes), a body mount type (e.g., a skin pad or tattoo), or a bio-implant type (e.g., an implantable circuit).

In some exemplary embodiment, the electronic device may be a home appliance. The home appliance can, for example, include at least one of a television (TV), a Digital Video Disk (DVD) player, an audio system, a refrigerator, an air conditioner, a cleaner, an oven, a microwave, a washing machine, an air cleaner, a set-top box, a home automation control panel, a security control panel, a TV box (for example, Samsung HomeSync™, Apple TV™, or Google TV™), a game console (e.g., Xbox™ or PlayStation™), an electronic dictionary, an electronic locking system, a camcorder, or an electronic frame.

In other exemplary embodiments, the electronic device may include at least one of various medical devices (e.g., various portable medical measurement devices (i.e., a blood sugar measuring device, a heart beat measuring device, a blood pressure measurement device, a body temperature measurement device or the like), Magnetic Resonance Angiography (MRA), Magnetic Resonance Imaging (MM), Computerized Tomography (CT), a photographing machine, or an ultrasonic machine, etc.), a navigation device, a Global Navigation Satellite System (GNSS), an Event Data Recorder (EDR), a Flight Data Recorder (FDR), a car infotainment device, an electronic equipment for ship (e.g., a navigation device for ship, a gyrocompass, etc.), avionics, a security device, a head unit for car, an industrial or home robot, an Automatic Teller's Machine (ATM) of a financial institution, a Point Of Sales (POS) of a shop, or an Internet of Things (IoT) device (e.g., an electric bulb, various sensors, an electricity or gas meter, a sprinkler device, a fire alarm, a thermostat, a streetlight, a toaster, an exerciser, a hot water tank, a heater, a boiler, etc.).

According to some exemplary embodiment, the electronic device may include at least one of a part of furniture or building/structure, an electronic board, an electronic signature receiving device, a projector, or various metering devices (e.g., a tap water, electricity, gas or radio wave metering device, etc.). In various exemplary embodiments, the electronic device may be one of the aforementioned various devices or a combination of more of them. The electronic device according to some exemplary embodiment may be a flexible electronic device. Also, the electronic device according to an exemplary embodiment of the present document is not limited to the aforementioned devices, and may include a new electronic device according to technology growth.

An electronic device according to various exemplary embodiments is described below with reference to the accompanying drawings. In the present document, the term 'user' may denote a person who uses the electronic device or a device (e.g., an artificial-intelligent electronic device) which uses the electronic device.

Figure 2:
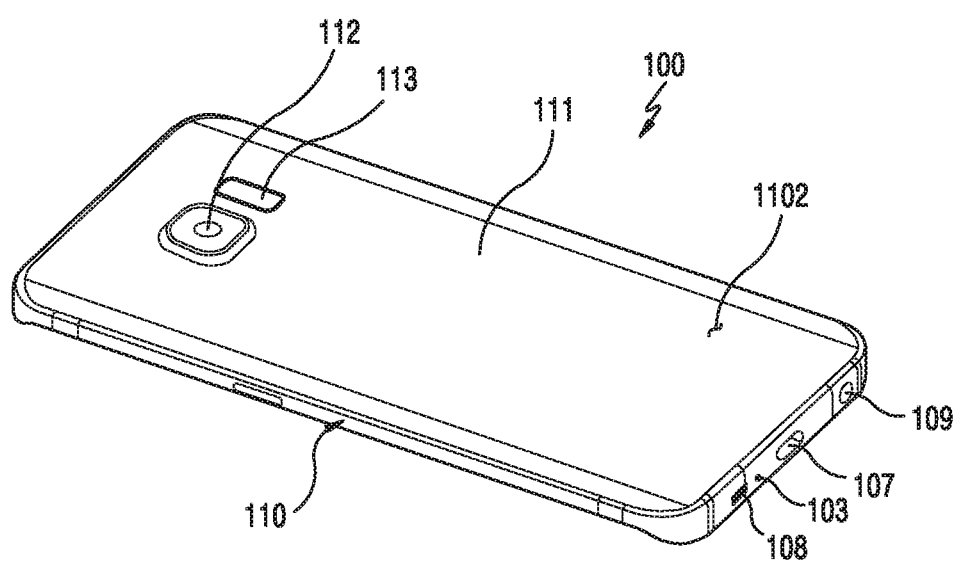
FIG. 2 illustrates a rear perspective diagram of an electronic device according to various exemplary embodiments of the present invention.

FIG. 1 is a front perspective diagram of an electronic device according to various exemplary embodiments of the present invention. FIG. 2 illustrates a rear perspective diagram of the electronic device according to the various exemplary embodiments of the present invention.

Referring to FIG. 1 and FIG. 2, the electronic device 100 may include a housing 110. According to one exemplary embodiment, the housing 110 may be formed of a metal member or a combination of a metal member and a non-metal member. According to one exemplary embodiment, a display 101 including a window (e.g., a front window or a glass plate) may be arranged in a front surface 1101 (e.g., a first surface) of the housing 110. According to one exemplary embodiment, the electronic device 100 may include a receiver 102 arranged in the housing 110 and outputting a counterpart's voice. According to one exemplary embodiment, the electronic device 100 may include a microphone 103 arranged in the housing 110 and transmitting a user's voice to a counterpart as well. According to one exemplary embodiment, the electronic device 100 may include at least one key input device that is arranged in the housing 110. According to one exemplary embodiment, the key input device may include a home key button 114, touch pads 115, and a side key button 116. The home key button 114 may be arranged in a front surface of the housing 110. The touch pads 115 may be arranged at both left and right sides of the home key button 114. The side key button 116 may be arranged in a side surface of the housing 110.

According to various exemplary embodiments, components for performing various functions of the electronic device 100 may be arranged around the receiver 102. The components may include at least one sensor module 104. This sensor module 104 may, for example, include at least one of an illuminance sensor (e.g., an optical sensor), a proximity sensor (e.g., an optical sensor), an infrared sensor, and/or an ultrasonic sensor. According to one exemplary embodiment, the components may include a front camera device 105. According to one exemplary embodiment, the components may include an indicator 106 (e.g., a Light Emitting Diode (LED) device) for indicating state information of the electronic device 100 for a user.

According to various exemplary embodiments, a speaker 108 may be arranged at one side of the microphone 103. According to one exemplary embodiment, an interface connector port 107 may be arranged at the other side of the microphone 103, and perform a function of data transmission/reception with an external device and charge the electronic device 100 with an applied external power source. According to one exemplary embodiment, an ear jack hole 109 may be arranged at one side of the interface connector port 107.

According to various exemplary embodiments, the electronic device 100 may include a rear window 111 arranged in a rear surface 1102 (e.g., a second surface) of the housing 110. According to one exemplary embodiment, a rear camera device 112 may be arranged in the rear window 111, and at least one electronic component 113 may be arranged at one side of the rear camera device 112. According to one exemplary embodiment, the electronic component 113 may include at least one of an illuminance sensor (e.g., an optical sensor), a proximity sensor (e.g., an optical sensor), an infrared sensor, an ultrasonic sensor, a heart rate sensor, and/or a flash device.

According to various exemplary embodiments, the display 101 may include a front window 1012 and a display module (not shown). The front window 1012 may be arranged to expose a front surface of the electronic device 100. The display module (not shown) may be arranged in a rear surface of the front window 1012 within the electronic device 100. According to one exemplary embodiment, an image displayed in the display module may be provided to a user through the front window 1012 of transparent materials. According to one exemplary embodiment, the front window 1012 may use various materials such as a transparent glass, acryl, etc.

According to various exemplary embodiments, the electronic device 100 may include a waterproof structure. According to one exemplary embodiment, the electronic device 100 may include at least one seal member (not shown) for waterproof therein. According to one exemplary embodiment, the at least one seal member may be arranged at least between the display module (not shown) and the housing 110 in a display module region of the display 101.

According to one exemplary embodiment, an arrangement structure of the at least one seal member between the display module (not shown) and the housing 110 makes unnecessary an arrangement space of another seal member between the front window 1012 and the housing 110, so the electronic device 100 may scale down or exclude a BM (Black Matrix) region in the display module region.

According to various exemplary embodiments, owing to a step region between a rear surface of the front window 1012 and the display module, at least one seal member may be divided into a plurality of seal members and arranged. According to one exemplary embodiment, a space (commonly called the step region) between a plurality of seal members may additionally have a waterproof structure by means of a separate waterproofing filling member.

According to various exemplary embodiments, a side surface of the display 101 where the seal member is arranged may be constructed to be exposed to moisture. According to one exemplary embodiment, the display 101 may include the display module, and at least one laminated member arranged below the display module. According to one exemplary embodiment, among the laminated members, a non-waterproof member may be implemented to have a waterproof structure by means of a peripheral laminated member including a waterproof function. According to one exemplary embodiment, the waterproof structure of the non-waterproof member implemented in an exemplary embodiment of the present invention makes it possible to employ a member (e.g., graphite) that could not have been employed because of its vulnerability to moisture though exhibiting a function (e.g., a heat radiating function) to the maximum.

Figure 3:
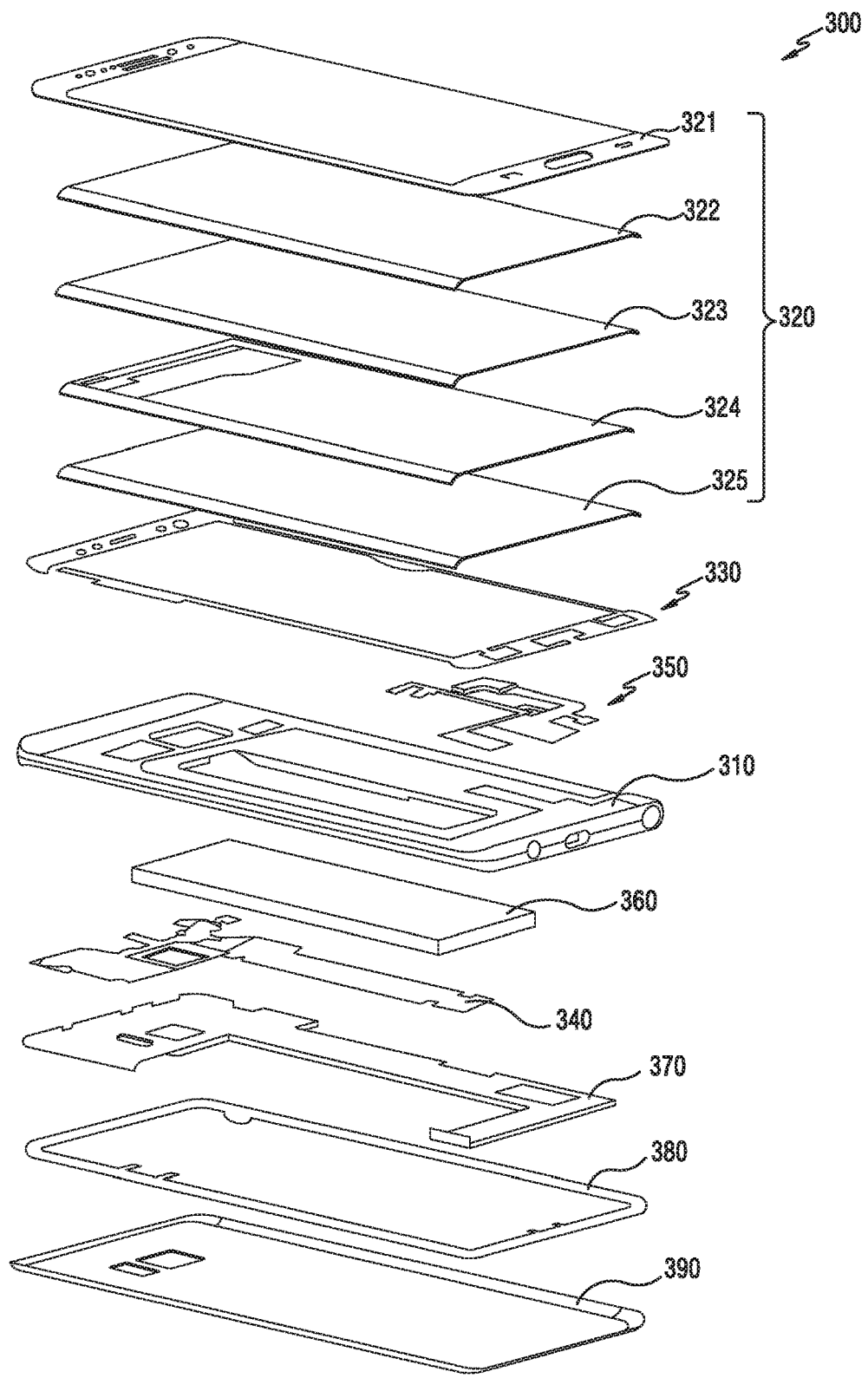
FIG. 3 is an exploded perspective diagram of an electronic device according to various exemplary embodiments of the present invention.

FIG. 3 is an exploded perspective diagram of an electronic device according to various exemplary embodiments of the present invention.

The electronic device 300 of FIG. 3 may be similar to the electronic device 100 of FIG. 1 and FIG. 2 or be an electronic device of another exemplary embodiment.

Referring to FIG. 3, the electronic device 300 may include a key input device 350, at least one seal member 330, and a display 320 including a window 321 (e.g., a glass plate) that are arranged in a front surface (e.g., a first surface) of a housing 310. According to one exemplary embodiment, the electronic device 300 may include a substrate 340 (e.g., a PCB, an FPC, etc.), a battery 360, a middle housing 370 (e.g., a bracket or rear housing), a rear seal member 380, and a rear window 390 that are arranged in a rear surface (e.g., a second surface) of the housing 310.

According to various exemplary embodiments, the electronic device 300 may further include a wireless power transmission/reception member (not shown). According to one exemplary embodiment, the electronic device 300 may also further include a detecting member (not shown) for detecting an electronic pen that is applied as a data input means. According to one exemplary embodiment, the detecting member may include an electromagnetic resonance (EMR) sensor pad that operates in an electromagnetic induction scheme so as to receive a feedback signal of a resonance frequency of a coil body of the electronic pen.

According to various exemplary embodiments, the battery 360 may be accommodated in a housing space of the housing 310, and may be arranged to avoid the substrate 340. According to one exemplary embodiment, the battery 360 and the substrate 340 may be arranged in a parallel scheme without being overlapped with each other. According to one exemplary embodiment, the key input device 350 may be arranged in a front direction of the housing 310. According to one exemplary embodiment, the key input device 350 may be arranged in a rear direction of the housing 310. According to one exemplary embodiment, the key input device 350 may consist of at least two key assemblies and in this case, may be arranged in a front surface and/or rear surface of the housing 310 as well.

According to various exemplary embodiments, the display 320 may include a display module 322 arranged in a rear surface of the window 321, and at least one laminated member 323, 324 or 325 arranged in a rear surface of the display module 322. According to one exemplary embodiment, the at least one laminated member 323, 324 or 325 may perform various functions in accordance with materials thereof. According to one exemplary embodiment, the at least one laminated member 323, 324 or 325 may include a polymer member 323 (e.g., a polymer layer), a non-waterproof member 324 (e.g., a moisture sensitive layer) and a conductive member 325 (e.g., a conductive layer) that are sequentially laminated on the rear surface of the display module 322.

According to one exemplary embodiment, the polymer member 323 may be attached to the rear surface of the display module 322, using an adhesive agent (e.g., an Optically Clear Adhesive (OCA), a Pressure Sensitive Adhesive (PSA), a general adhesive agent or bonding agent and a heat reactive adhesive agent), and may perform an absorbing action. According to one exemplary embodiment, the polymer member 323 may apply a dark color (e.g., black) to give a help to background showing at display off. According to one exemplary embodiment, the conductive member 325 may include a metal member for shielding a noise and dispersing a heat emitted from a peripheral heat emitting component. According to one exemplary embodiment, the metal member may include copper (Cu). According to one exemplary embodiment, the non-waterproof member 324, materials vulnerable to moisture, may include an added display, a force touch flexible printed circuit board (FPCB), a fingerprint scan sensor FPCB, a communicating antenna radiator, a heat radiating sheet, a conductive/non-conductive tape, an open cell sponge or a graphite sheet for heat radiation.

According to various exemplary embodiments, the electronic device 300 interposes the seal member 330 between the display module 322 of the display 320 and the housing 310 for the purpose of minimization of a BM region. Therefore, at least a partial region of a side surface of the display 320 may be exposed to moisture that is infiltrated into a gap between the window 321 and the housing 310. According to one exemplary embodiment, the non-waterproof member 324 may be configured to have a waterproof structure by peripheral laminated members (e.g., the polymer member 323 and/or the conductive member 325) that are arranged adjacently and perform a general function (e.g., a heat radiating function, a noise shielding function, etc.).

According to various exemplary embodiments, the window 321 may be attached to a front surface of the housing 310 by means of the seal member 330. According to one exemplary embodiment, the seal member 330 may be divided into a plurality of unit seal members with a criterion of a step region between a rear surface of the window 321 and the display module 322. Commonly, the seal member 330 may be attached along an edge of the display module 322 and an edge of the window 321. According to one exemplary embodiment, the rear window 390 may be attached by means of the rear seal member 380 that has a closed-loop shape and is arranged along a rear surface edge of the housing 310. According to one exemplary embodiment, the seal member 330 and the rear seal member 380 may include at least one of a tape, an adhesive agent, waterproof dispenser, silicon, a waterproof rubber and urethane.

Figure 4A:
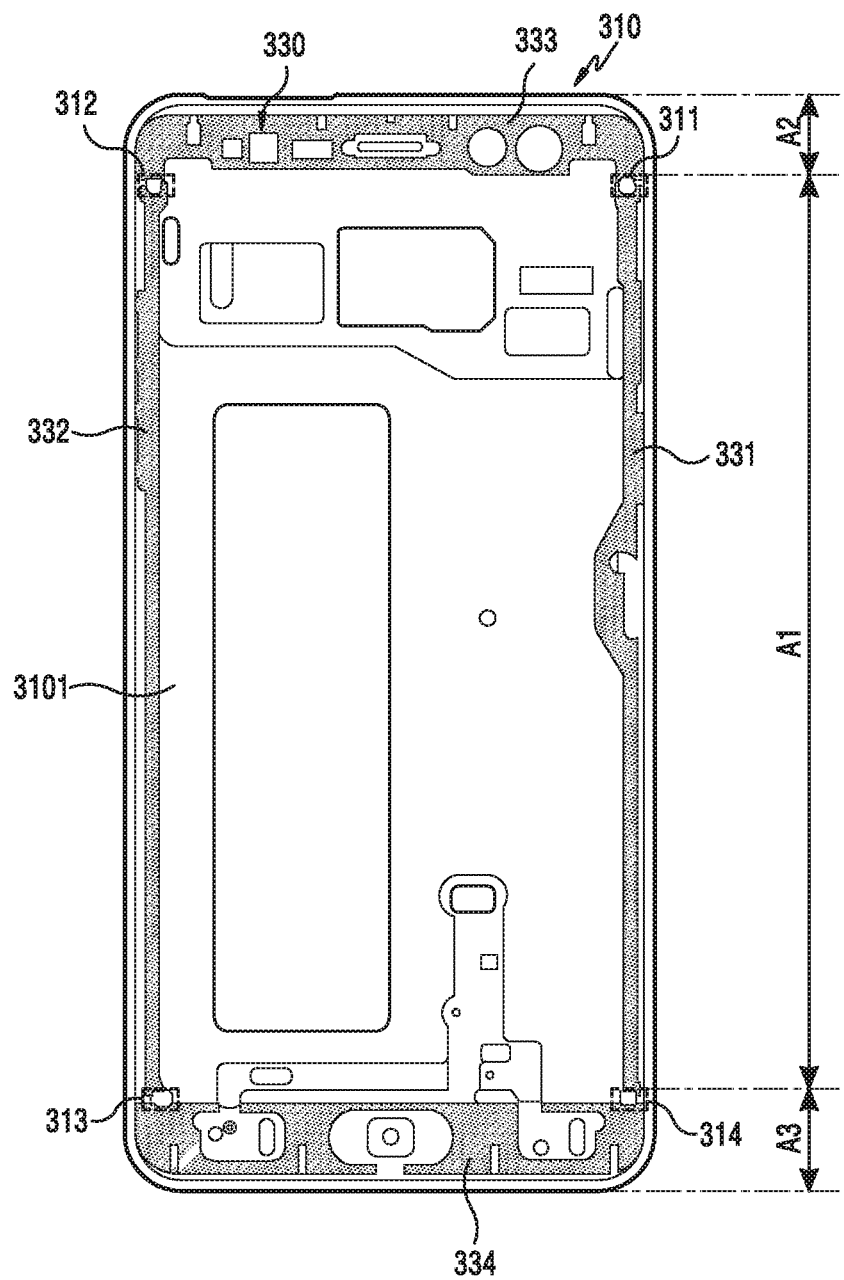
FIG. 4A to FIG. 4C are diagrams illustrating a state in which a waterproofing filling member is applied to a housing according to various exemplary embodiments of the present invention.
Figure 4B:
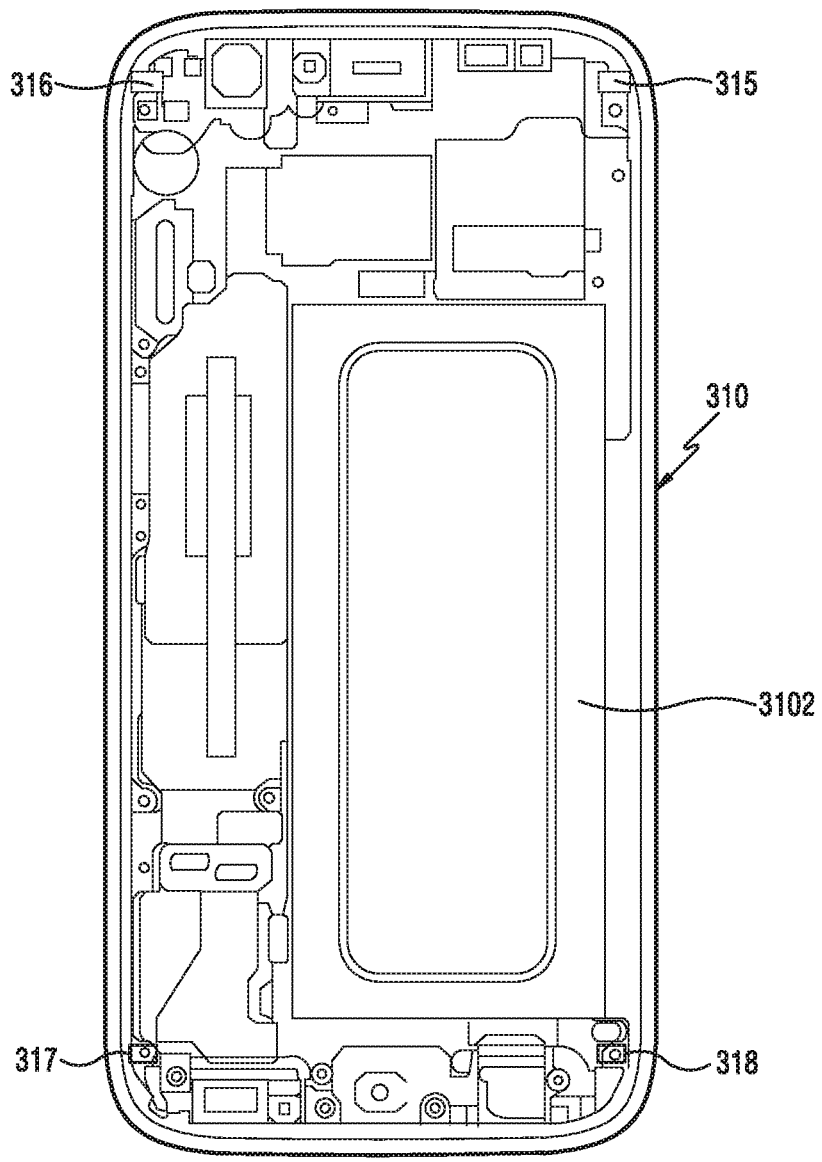
Figure 4C:
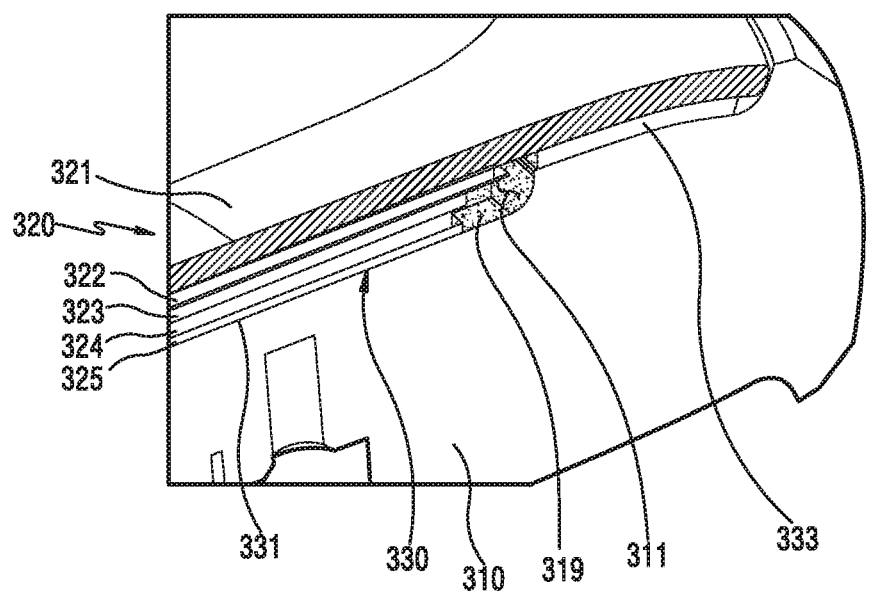

FIG. 4A to FIG. 4C are diagrams illustrating a state in which a waterproofing filling member is applied to a housing according to various exemplary embodiments of the present invention.

Referring to FIG. 4A to FIG. 4C, the seal member 330 may be attached along an edge of the housing 310. According to one exemplary embodiment, the seal member 330 may include a plurality of unit seal members. According to one exemplary embodiment, the seal member 330 may include a display module attachment region (A1 region) and window attachment regions (A2 region and A3 region) along a length direction of the housing 310. The window attachment regions (A2 region and A3 region) may be arranged in an upper part of the display module attachment region (A1 region) and a lower part thereof. According to one exemplary embodiment, the seal member 330 may include a plurality of seal members that are divided and attached so as to prevent adhesiveness from being noticeably deteriorated by a step region between a rear surface of a window and a display module arranged in a rear surface of the window.

According to various exemplary embodiments, the seal member 330 may include a first seal member 331, a second seal member 332, a third seal member 333 and a 4th seal member 334. According to one exemplary embodiment, the first and second seal members 331 and 332 may be arranged in the attachment region (A1 region) that is attached with the display module. According to one exemplary embodiment, the third and 4th seal members 333 and 334 may be arranged in the attachment regions (the A2 region and the A3 region) that are attached with the window. According to one exemplary embodiment, the seal member 330 may include at least one of a tape, an adhesive agent, a waterproof dispenser, silicon, a waterproof rubber and urethane.

According to various exemplary embodiments, the housing 310 to which the seal member 330 is attached may have a step region (e.g., a gap) resulting from a height difference between the rear surface of the window and the display module. According to one exemplary embodiment, the step region may include a boundary region 311 between the first seal member 331 and the third seal member 333, a boundary region 314 between the first seal member 331 and the 4th seal member 334, a boundary region 312 between the second seal member 332 and the third seal member 333, and a boundary region 313 between the second seal member 332 and the 4th seal member 334. According to one exemplary embodiment, these step regions 311, 312, 313 and 314, portions vulnerable to moisture infiltration, may additionally apply a separate waterproofing filling member (319 of FIG. 4C), to have an airtight structure of blocking a generally internal region of the housing 310 from external moisture by the seal member 330 and the waterproofing filling member 319.

According to various exemplary embodiments, the waterproofing filling member 319 may be injected through filling member injection holes 315, 316, 317 and 318 that are provided in the step regions 311, 312, 313 and 314 resulting from the plurality of unit seal members 331, 332, 333 and 334 of the housing 310. According to one exemplary embodiment, the waterproofing filling member 319 may be injected to a rear surface 3102 of the housing 310 through the filling member injection holes 315, 316, 317 and 318 that are provided in the step regions 311, 312, 313 and 314 of the housing 310. According to one exemplary embodiment, the waterproofing filling member 319 may include semi-solid state or liquid state materials and thus include the property of being solidified in a natural or external condition (e.g., a heat, ultraviolet, a pressure, etc.). According to one exemplary embodiment, for example, after the display 320 including the display module 322, the polymer member 323, the non-waterproof member 324 and the conductive member 325 sequentially laminated on a rear surface of the window 321 is adhered at a front surface 3101 of the housing 310 by the seal member 330 (e.g., the first seal member 331 and the third seal member 333), the waterproofing filling member 319 is injected at the rear surface 3102 of the housing 310 through the filling member injection holes 315, 316, 317 and 318, whereby a waterproof structure of the housing 310 may be implemented. But, an exemplary embodiment is not limited to this, and before the display 320 is attached at the front surface 3101 of the housing 310, the waterproofing filling member 319 may be attached by the seal member 330 after being first applied to the above step regions 311, 312, 313, and 314 of the housing 310 as well.

According to various exemplary embodiments, by providing between the display 320 and the housing 310 an airtight space resulting from a closed loop of no discontinuous section formed through the plurality of seal members 331, 332, 333 and 334 and the waterproofing filling member 319, the electronic device may implement a perfect waterproof function.

Figure 5A:
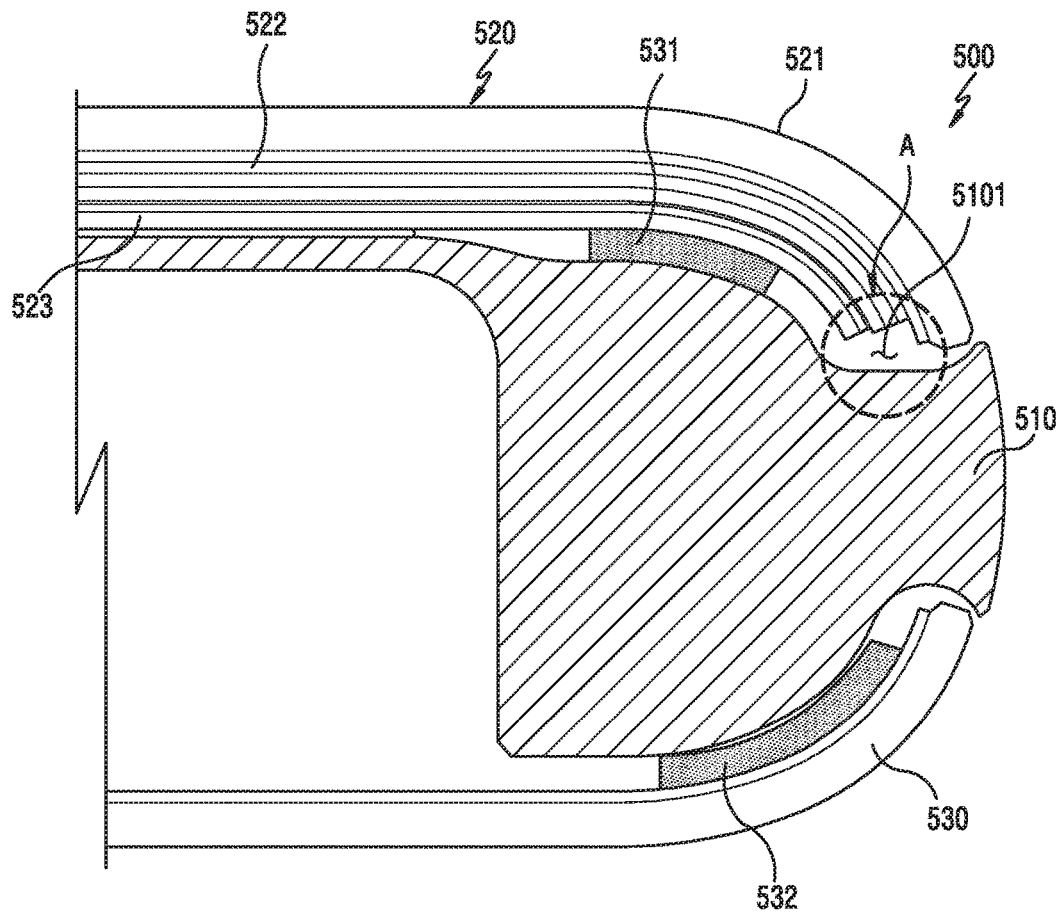
FIG. 5A is a cross section of an electronic device illustrating a waterproof structure resulting from seal members according to various exemplary embodiments of the present invention.
Figure 5B:
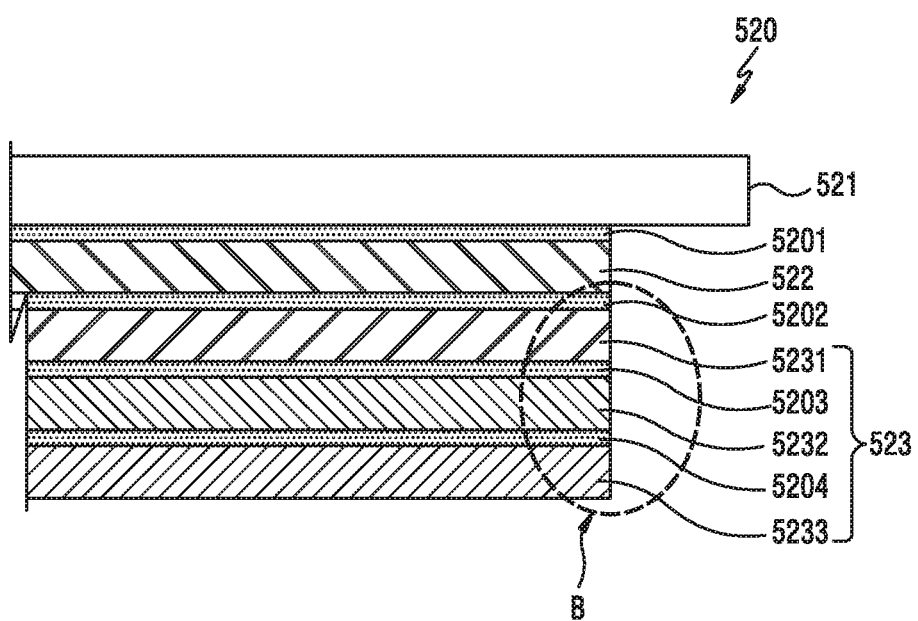
FIG. 5B is a detailed cross section illustrating an 'A' region of FIG. 5A according to various exemplary embodiments of the present invention.

FIG. 5A is a cross section of an electronic device illustrating a waterproof structure resulting from seal members according to various exemplary embodiments of the present invention. FIG. 5B is a detailed cross section illustrating an 'A' region of FIG. 5A according to various exemplary embodiments of the present invention.

The electronic device 500 of FIG. 5A may be similar to the electronic device 100 of FIG. 1 and FIG. 2 or the electronic device 300 of FIG. 3, or be an electronic device of another exemplary embodiment.

Referring to FIG. 5A and FIG. 5B, the electronic device 500 may include a display 520 attached to a front surface of a housing 510 by a seal member 531, and a rear window 530 attached to a rear surface of the housing 510 by a rear seal member 532. According to one exemplary embodiment, the housing 510 may have an airtight internal space for waterproof by means of the seal member 531 attached to the display 520 and the rear seal member 532 attached to the rear window 530.

According to various exemplary embodiments, the display 520 may include a window 521, a display module 522 arranged in a rear surface of the window 521, and at least one laminated member 523 arranged in a rear surface of the display module 522. According to one exemplary embodiment, the at least one laminated member 523 may, as illustrated in FIG. 5B, perform various functions in accordance with materials. According to one exemplary embodiment, the at least one laminated member 523 may include a polymer member 5231 (e.g., a polymer layer), a non-waterproof member 5232 (e.g., a moisture sensitive layer) and a conductive member 5233 (e.g., a conductive layer) that are sequentially laminated on a rear surface of the display module 522. According to one exemplary embodiment, the polymer member 5231 may be attached to the rear surface of the display module 522, using an adhesive agent (e.g., an OCA, a PSA, a general adhesive agent or bonding agent and a heat reactive adhesive agent), and may perform an absorbing action. According to one exemplary embodiment, the polymer member 5231 may apply a dark color (e.g., black) to give a help to background showing at display off. According to one exemplary embodiment, the conductive member 5233 may include a metal member for shielding a noise and dispersing a heat emitted from a peripheral heat emitting component. According to one exemplary embodiment, the metal member may include copper (Cu). According to one exemplary embodiment, the non-waterproof member 5232, materials vulnerable to moisture, may include an added display, a force touch FPCB, a fingerprint scan sensor FPCB, a communicating antenna radiator, a heat radiating sheet, a conductive/non-conductive tape, an open cell sponge or a graphite sheet for heat radiation.

According to various exemplary embodiments, the display 520 may include adhesive members 5201, 5202, 5203 and 5204 that are interposed as adhesive layers between the window 521 and the display module 522, between the display module 522 and the polymer member 5231, between the polymer member 5231 and the non-waterproof member 5232, and between the non-waterproof member 5232 and the conductive member 5233. According to one exemplary embodiment, the adhesive members 5201, 5202, 5203 and 5204 may include at least one of an OCA, a PSA, a general adhesive agent or bonding agent and a heat reactive adhesive agent.

According to various exemplary embodiments, because the electronic device 500 interposes the seal member 531 between the display module 522 of the display 520 and the housing 510 for the purpose of minimization of a BM region, at least a partial region (e.g., a region where at least the display module 522 is arranged) of a side surface of the display 520 may be exposed to moisture infiltrated into a gap (i.e., a region 5101 of FIG. 5A) between the window 521 and the housing 510. According to one exemplary embodiment, the non-waterproof member 5232 corresponding to a 'B' region of FIG. 5B may be configured to perform a general function (e.g., a heat radiating function, a noise shielding function, etc.) while having a waterproof structure by an arrangement structure (e.g., a junction structure) of the neighboring peripheral laminated members (e.g., the polymer member 5231 and the conductive member 5233).

Figure 6:
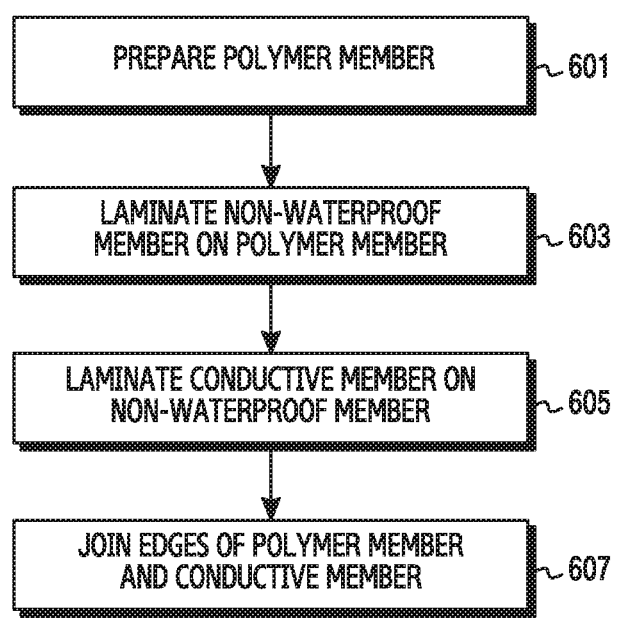
FIG. 6 is a diagram illustrating a process for waterproofing a non-waterproof member according to various exemplary embodiments of the present invention.
Figure 7A:
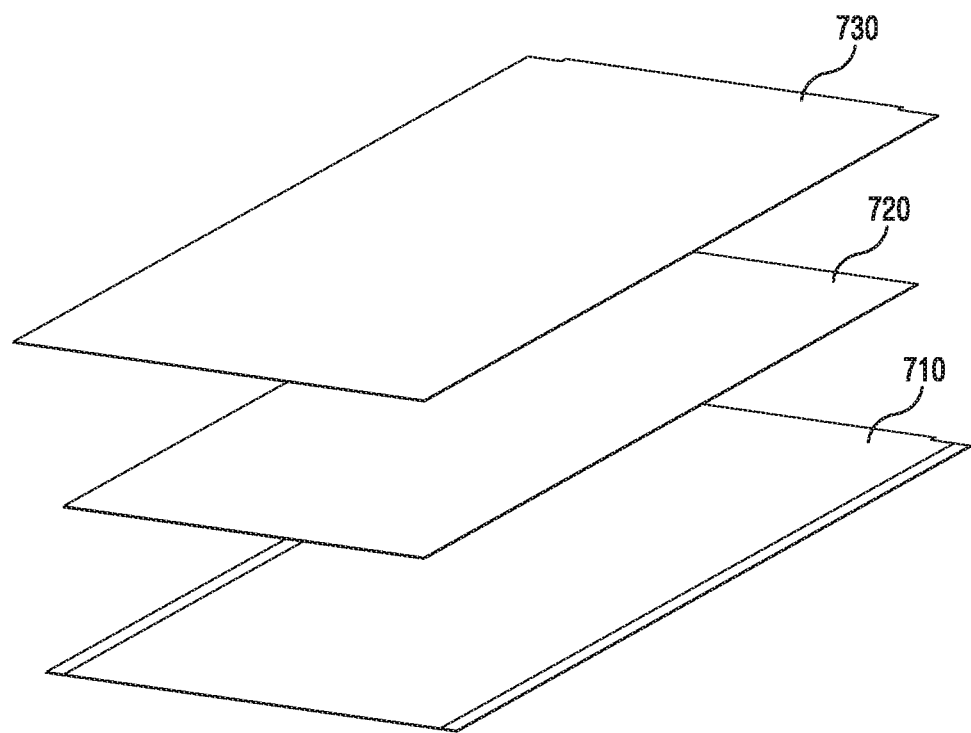
FIG. 7A to FIG. 7C are diagrams illustrating a sequence for waterproofing a non-waterproof member in a 'B' region of FIG. 5B according to various exemplary embodiments of the present invention.
Figure 7B:
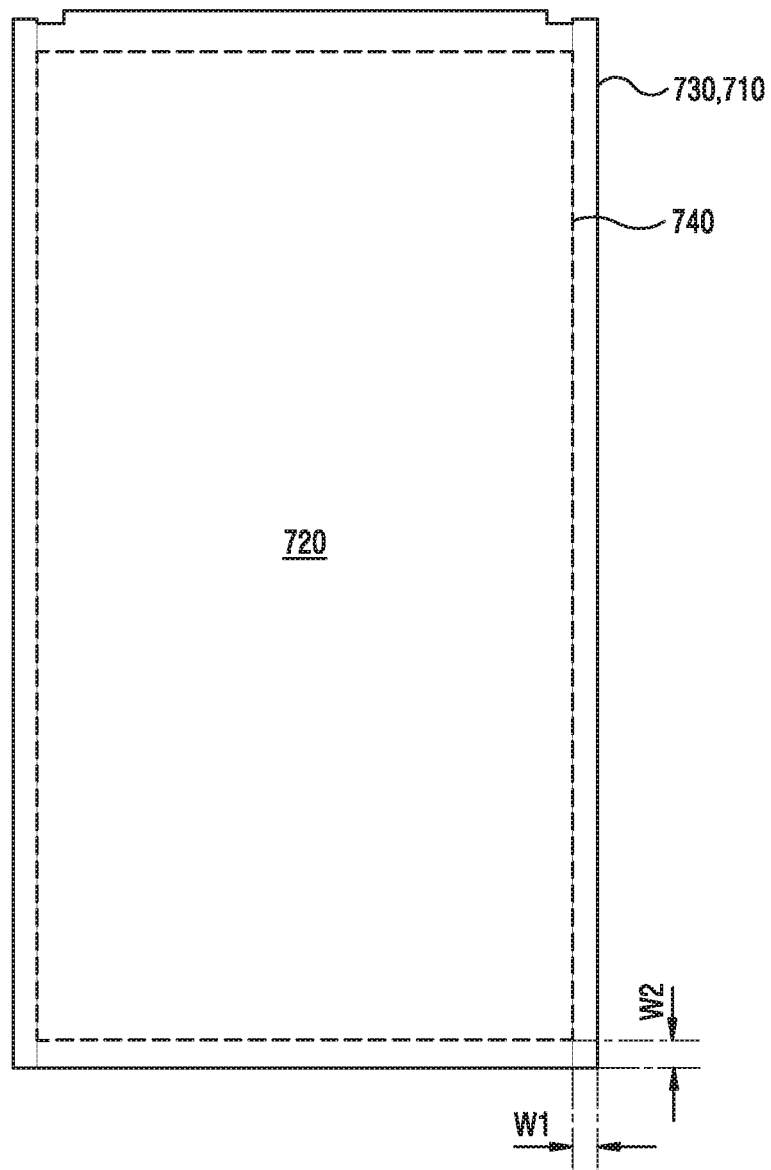
Figure 7C:
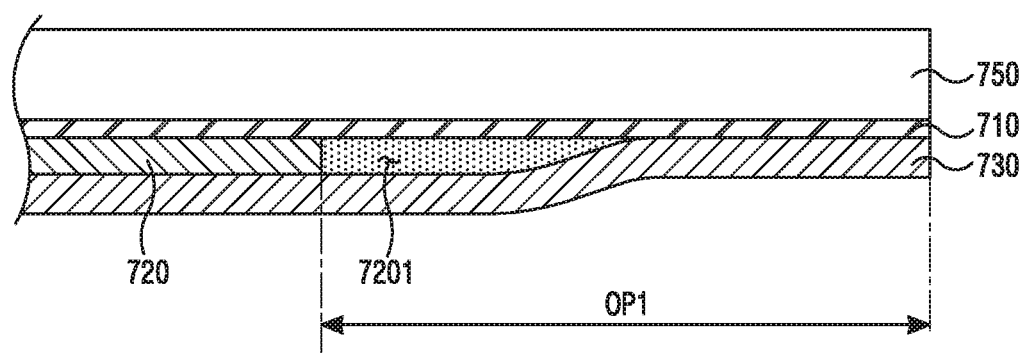
Figure 7D:
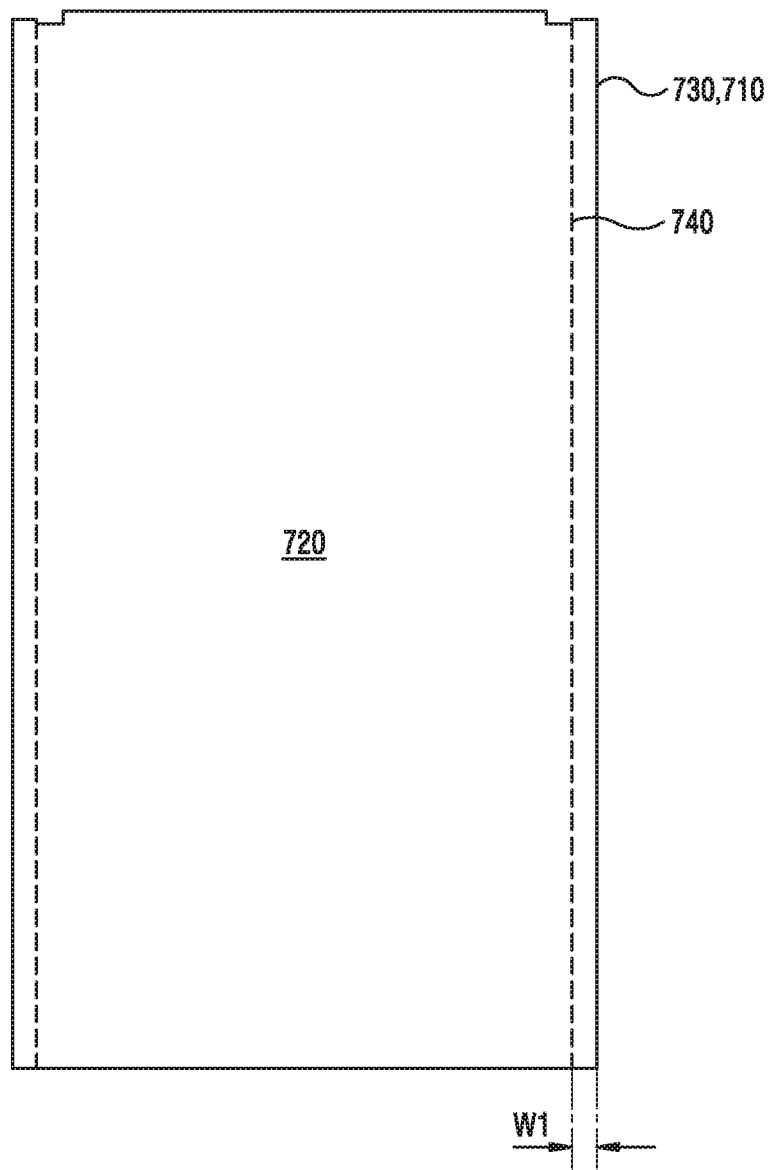
FIG. 7D is a diagram illustrating a construction for waterproofing a non-waterproof member having a junction region according to various exemplary embodiments of the present invention.

FIG. 6 is a diagram illustrating a process for waterproofing a non-waterproof member according to various exemplary embodiments of the present invention. FIG. 7A to FIG. 7C are diagrams illustrating a sequence for waterproofing the non-waterproof member in the 'B' region of FIG. 5B according to various exemplary embodiments of the present invention. FIG. 7D is a diagram illustrating a construction for waterproofing the non-waterproof member having a junction region according to various exemplary embodiments of the present invention.

A process sequence of a laminated structure for waterproofing the non-waterproof member of FIG. 6 is described with reference to FIG. 7A to FIG. 7D.

Referring to FIG. 6 to FIG. 7C, in operation 601, a polymer member 710 may be prepared. According to one exemplary embodiment, the polymer member 710 may be attached to a rear surface of a display module 750, using an adhesive agent (e.g., an OCA, a PSA, a general adhesive agent or bonding agent and a heat reactive adhesive agent), and may perform an absorbing action. According to one exemplary embodiment, the polymer member 710 may apply a dark color (e.g., black) to give a help to background showing at display off. According to one exemplary embodiment, the polymer member 710 may include a colored sponge.

According to various exemplary embodiments, in operation 603, a non-waterproof member 720 may be laminated on the polymer member 710. According to one exemplary embodiment, the non-waterproof member 720 may be attached to the polymer member 710, using an adhesive agent (e.g., an OCA, a PSA, a general adhesive agent or bonding agent and a heat reactive adhesive agent). According to one exemplary embodiment, the non-waterproof member 720, materials vulnerable to moisture, may include an added display, a force touch FPCB, a fingerprint scan sensor FPCB, a communicating antenna radiator, a heat radiating sheet, a conductive/non-conductive tape, an open cell sponge or a graphite sheet for heat radiation.

According to various exemplary embodiments, in operation 605, a conductive member 730 may be laminated on an upper part of the non-waterproof member 720. According to one exemplary embodiment, the conductive member 730 may shield that a noise generated from a peripheral electronic component is forwarded to the display module 750, to prevent a malfunction phenomenon (e.g. a flicker phenomenon) of a display. According to one exemplary embodiment, the conductive member 730 may include a metal member for dispersing a heat emitted from a peripheral heat emitting component. According to one exemplary embodiment, the metal member may include copper (Cu).

According to various exemplary embodiments, in operation 607, the polymer member 710 and the conductive member 730 may be joined with each other along their edges. According to one exemplary embodiment, the polymer member 710 and the conductive member 730 may be directly joined with each other except for the non-waterproof member 720 that is interposed between the polymer member 710 and the conductive member 730. According to one exemplary embodiment, the polymer member 710 and the conductive member 730 may be joined with each other by ultrasonic fusion, pressing, bonding or a separate adhesive means (e.g., a double-sided tape, etc.).

According to various exemplary embodiments, the non-waterproof member 720 may be interposed between the polymer member 710 and the conductive member 730, whereby a waterproof structure for the non-waterproof member 720 may be implemented by means of a junction between the polymer member 710 and the conductive member 730. But, an exemplary embodiment is not limited to this, and the waterproof structure for the non-waterproof member 720 may be implemented using various peripheral members in accordance with the kind of the peripheral members. According to one exemplary embodiment, the waterproof structure for the non-waterproof member 720 may be implemented using at least one of a tape, an FPCB, an adhesive agent, a sponge, a thin film metal, a thin film plastic sheet, a urethane film or a polyethylene terephthalate (PET) film, instead of the polymer member 710 and/or the conductive member 730, as well.

According to various exemplary embodiments, the non-waterproof member 720 may be formed smaller in size than the polymer member 710 and the conductive member 730 for the purpose of a smooth junction process for waterproof. According to one exemplary embodiment, the polymer member 710 and the conductive member 730 may be formed to have the same size. According to one exemplary embodiment, the polymer member 710 and the conductive member 730 may be formed to have a mutually different size, wherein the member 710 or 730 formed to have a smaller size may be formed larger than the non-waterproof member 720 as well. For example, as illustrated in FIG. 7B, the non-waterproof member 720 may be formed along a junction line 740. The junction line 740 is a line that is scaled down inside by a constant size from an edge of the conductive member 730 (or the polymer member 710). According to one exemplary embodiment, it is advantageous that widths (W1 and W2) ranging from the edge of the conductive member 730 (or the polymer member 710) to the junction line 740 are as small as possible, but the widths (W1 and W2) may be formed to have sizes not interfering with a junction process. According to one exemplary embodiment, a space region (e.g., a region including a horizontal junction line or a region including a vertical junction line) made airtight by the aforementioned seal member may not apply the junction process between the polymer member 710 and the conductive member 730.

According to various exemplary embodiments, the polymer member 710, the non-waterproof member 720 and the conductive member 730 may be adhered through one material or a unified adhesive member. According to one exemplary embodiment, the adhesive member may include a double-sided tape. For example, the adhesive member may be applied to each of the polymer member 710 and the conductive member 730. In this case, in a center region, all of the polymer member 710, the non-waterproof member 720 and the conductive member 730 may be adhered to one another by the adhesive member. And, in the junction regions (W1 and W2), the polymer member 710 and the conductive member 730 may be adhered to each other through the adhesive member. According to one exemplary embodiment, the adhesive member may be applied only to the polymer member 710. In this case, in the center region, only the polymer member 710 and the non-waterproof member 720 may be adhered to each other through the adhesive member. And, in the junction regions (W1 and W2), the polymer member 710 and the conductive member 730 may be adhered to each other through the adhesive member. According to one exemplary embodiment, the adhesive member may be applied only to the conductive member 730. In this case, in the center region, only the conductive member 730 and the non-waterproof member 720 may be attached to each other through the adhesive member. And, in the junction regions (W1 and W2), the conductive member 730 may be attached to the polymer member 710 through the adhesive member.

According to various exemplary embodiments, the polymer member 710, the non-waterproof member 720 and the conductive member 730 may be mutually adhered through a plurality of materials or a dual adhesive member. According to one exemplary embodiment, the adhesive member may include a first double-sided tape and a second double-sided tape. This may be used when separate adherence is needed due to outer coating, etc. of the non-waterproof member 720 or when there is a need to differently apply a thickness of the double-sided tape. For example, one or more adhesive members may be applied to each of the polymer member 710 and the conductive member 730. In this case, in the center region, all of the polymer member 710, the non-waterproof member 720 and the conductive member 730 may be mutually adhered or fused as a first structure, and in the junction regions (W1 and W2), the polymer member 710 and the conductive member 720 may be mutually adhered or fused as a second structure. According to one exemplary embodiment, in case where one or more adhesive members are applied only to the polymer member 710, in the center region, only the polymer member 710 and the non-waterproof member 720 may be mutually adhered through the adhesive member, and in the junction regions (W1 and W2), the polymer member 710 and the conductive member 730 may be mutually adhered through the adhesive member. According to one exemplary embodiment, in case where one or more adhesive members are applied only to the conductive member 730, in the center region, only the conductive member 730 and the non-waterproof member 720 may be mutually adhered through the adhesive member, and in the junction regions (W1 and W2), the conductive member 730 may be attached to the polymer member 710 through the adhesive member.

According to various exemplary embodiments, by the above-mentioned junction body arranged in a rear surface of the display module, upper and lower waterproof members arranged in a window region of the display module, waterproof members arranged at both sides of a rear surface of the junction body, and another waterproof member filling a discontinuity part between the waterproof members, the electronic device may provide a waterproof space. According to one exemplary embodiment, in a case of a side surface of a laminated object located outside a waterproof line formed by a waterproof member, the infiltration of moisture may be prevented by making airtight an exposed part (e.g., both lateral parts) of the non-waterproof member 720 as mentioned above. Also, in a case of upper and lower side surfaces of a laminated object located inside the waterproof line formed by the waterproof member, the infiltration of moisture may be prevented through the above waterproof member, even though an exposed surface of the non-waterproof member 720 is not made airtight.

According to various exemplary embodiments, as illustrated in FIG. 7C, after completion of the junction process between the polymer member 710 and the conductive member 730 between which the non-waterproof member 720 is interposed, the corresponding junction body may be attached to a rear surface of a display module 750 by means of a certain adhesive agent (e.g., an OCA, a PSA, a general adhesive agent or bonding agent and a heat reactive adhesive agent). According to one exemplary embodiment, a step space 7201 caused by a thickness of the non-waterproof member 720 may be provided amongst a junction region (OP1) between the polymer member 710 and the conductive member 730 other than the non-waterproof member 720. According to one exemplary embodiment, the corresponding step space 7201 may be filled by filling materials as well. Though not illustrated, an EMR sensor pad of an electromagnetic induction scheme for detecting an input signal of an electronic pen may be further arranged between the aforementioned junction layers or between the junction body 710, 720 or 730 and the display module 750 or between the display module 750 and a window (not shown) as well.

Referring to FIG. 7D, a waterproof structure for the non-waterproof member 720 having a relative small area may be implemented by means of junction regions that has widths (W1) with a criterion of junction lines 740 that are formed along an edge of the polymer member 710 (or the conductive member 730). According to one exemplary embodiment, in a case of FIG. 7D, by the aforementioned airtight waterproof structure of the seal members formed along an edge of the electronic device, junction lines may be excluded at upper and lower sides of the non-waterproof member 720. In this case, the junction regions including the junction lines may be formed only at left and right side surfaces of the non-waterproof member 720.

According to various exemplary embodiments, prior to the junction process for constructing the aforementioned junction body, the polymer member 710 may be first attached to the rear surface of the display module 750 as well. According to one exemplary embodiment, after the polymer member 710 is first attached to the display module 750 and then the non-waterproof member 720 and the conductive member 730 are sequentially attached to the polymer member 710, the junction process may be finally carried out along edges of the polymer member 710 attached to the display module 750 and the conductive member 730 as well. This is to prevent a phenomenon in which when the polymer member 710 is a sponge, a bubble is generated in a region of attachment between the sponge and the display module 750.

Figure 8A:
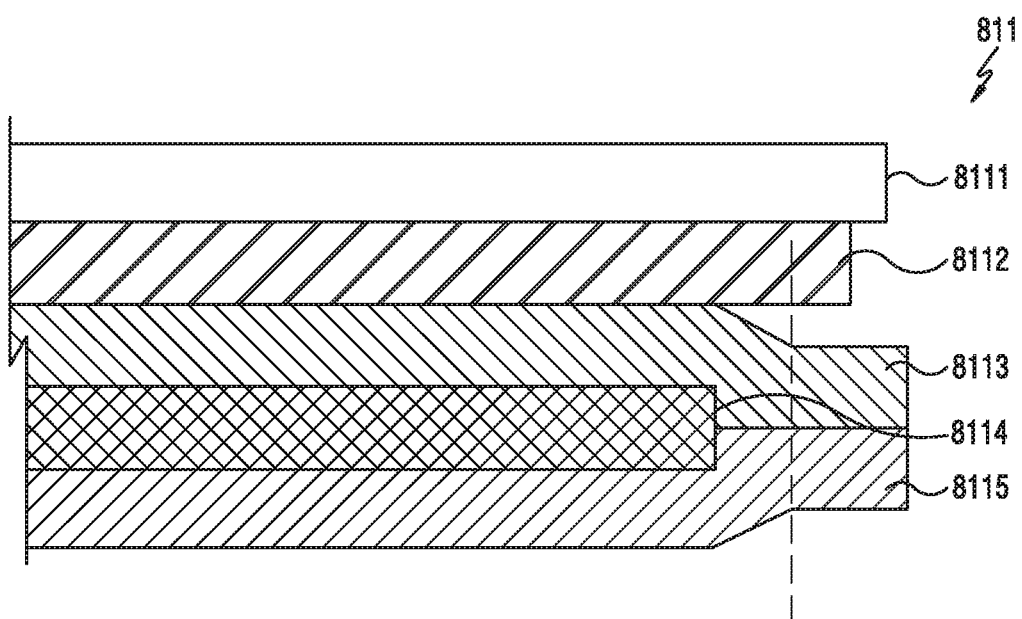
FIG. 8A to FIG. 8R are cross sections of a display including a waterproof structure for a non-waterproof member according to various exemplary embodiments of the present invention.
Figure 8B:
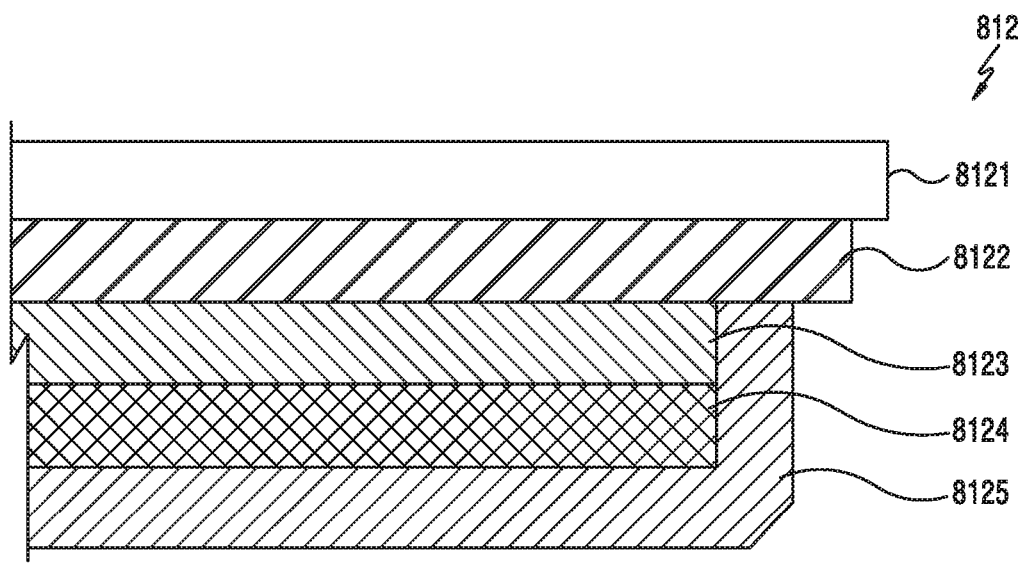
Figure 8C:
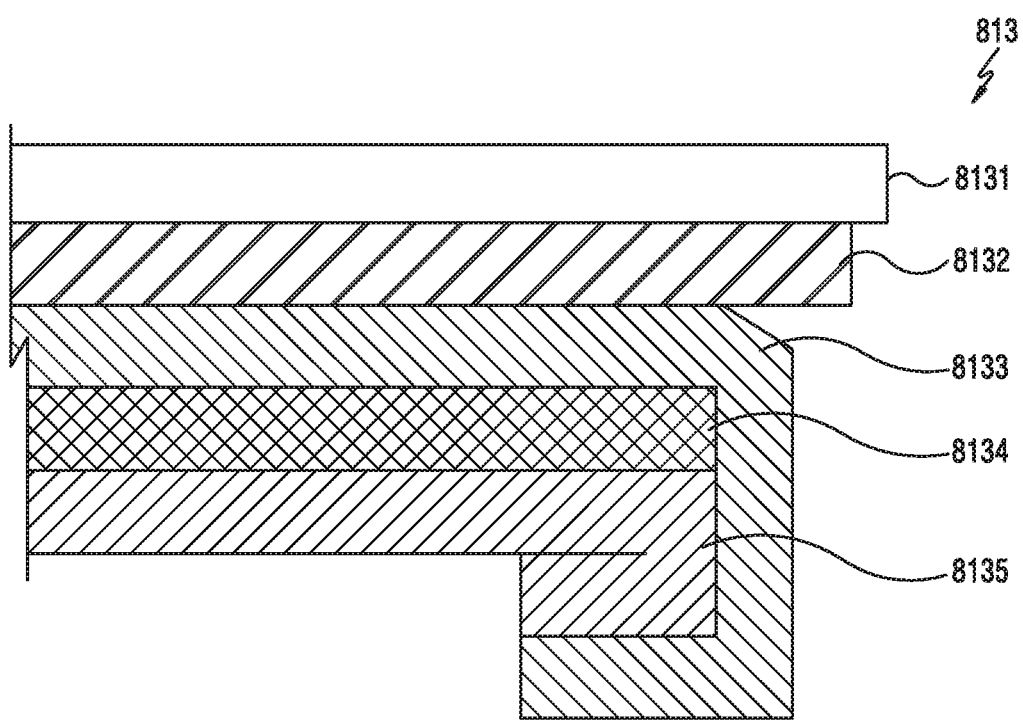
Figure 8D:
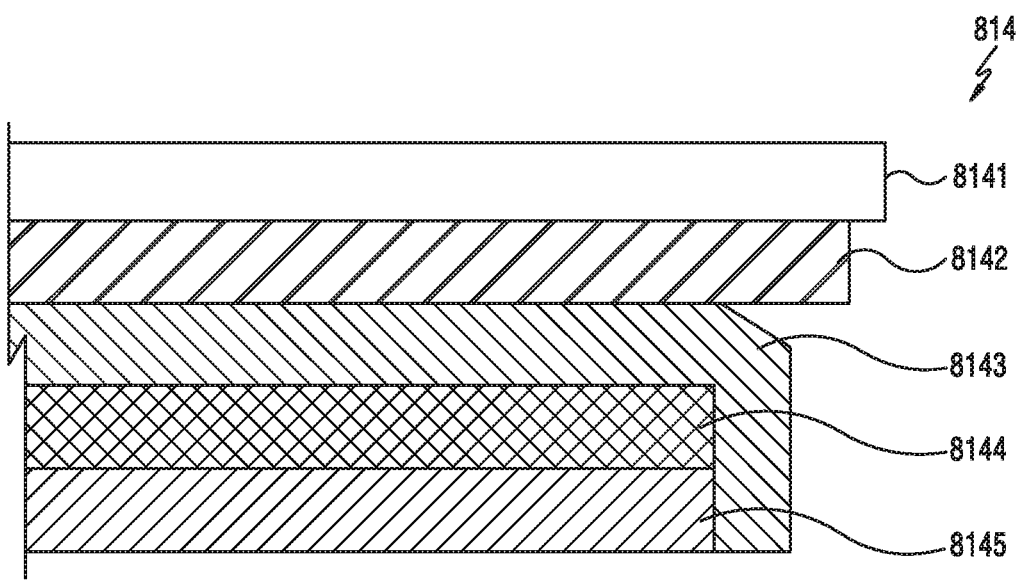
Figure 8E:
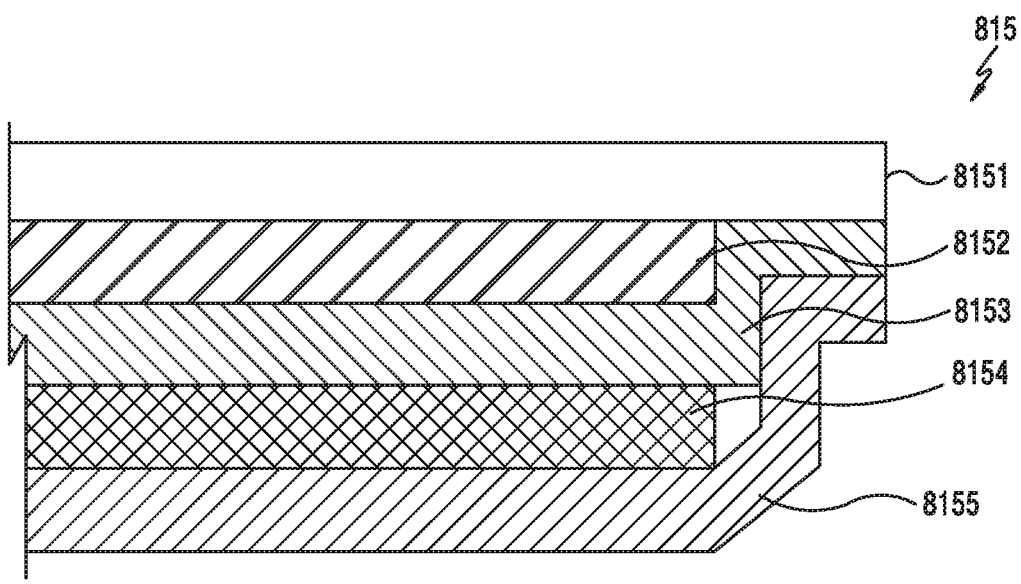
Figure 8F:
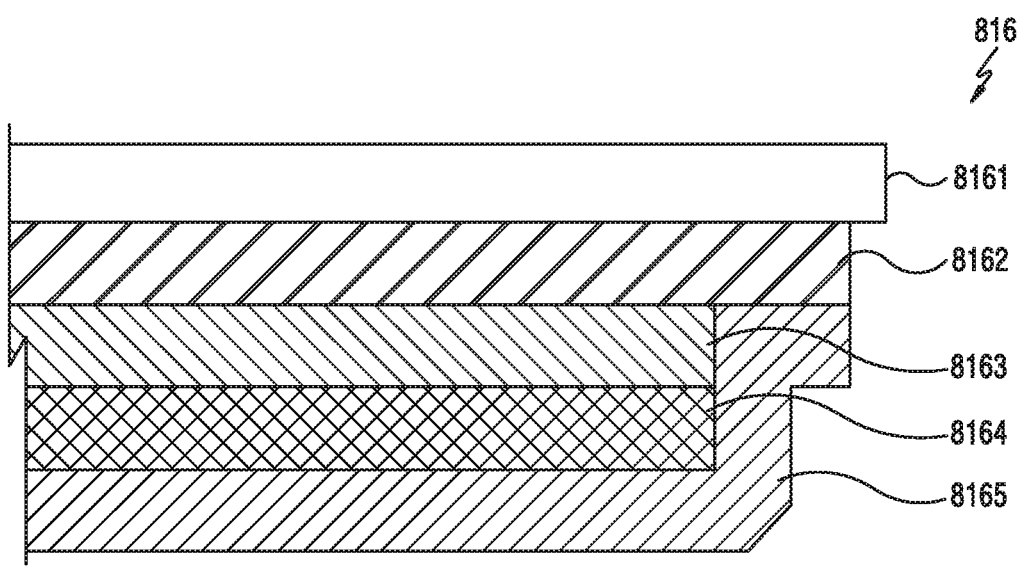
Figure 8G:
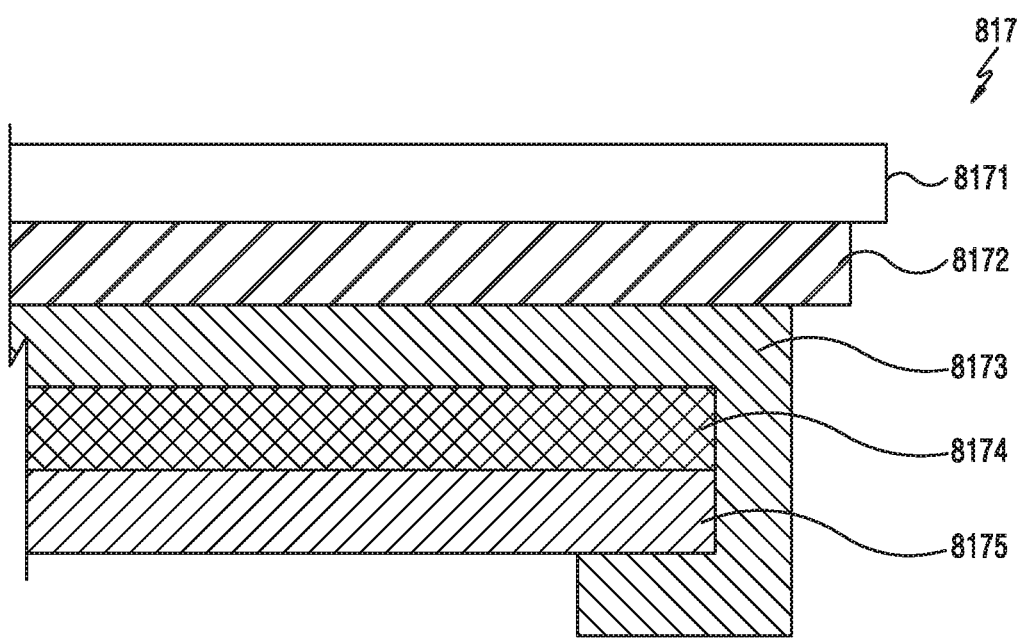
Figure 8H:
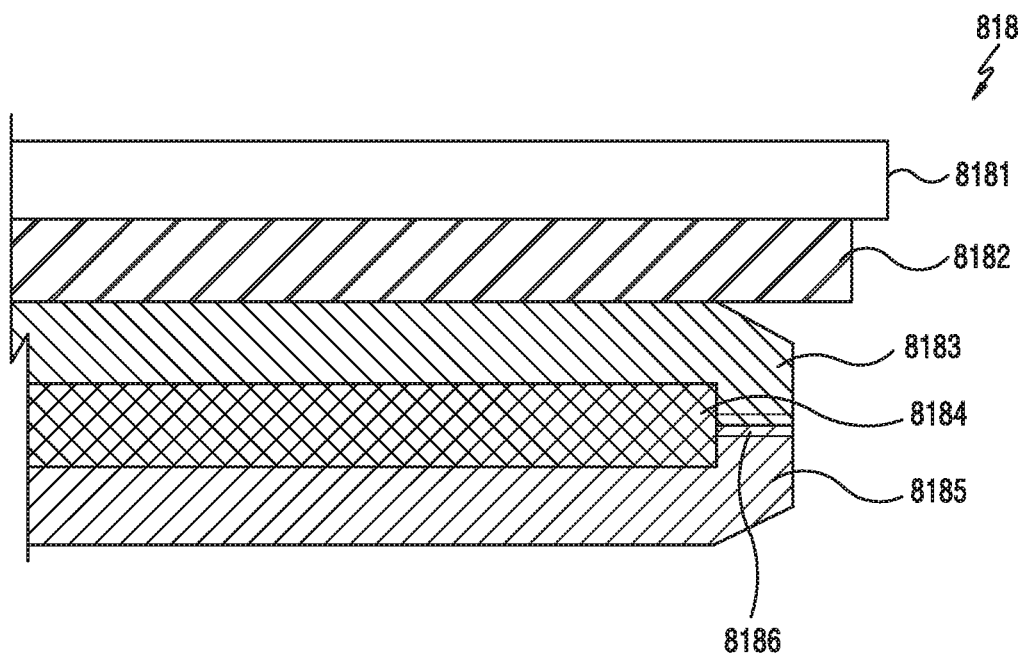
Figure 8I:
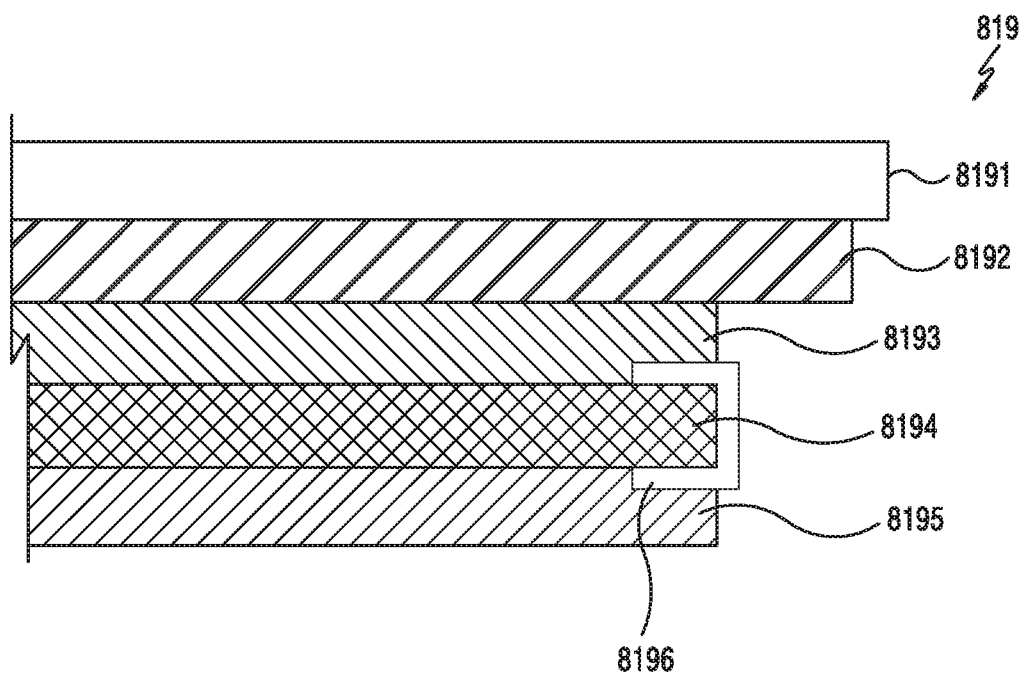
Figure 8J:
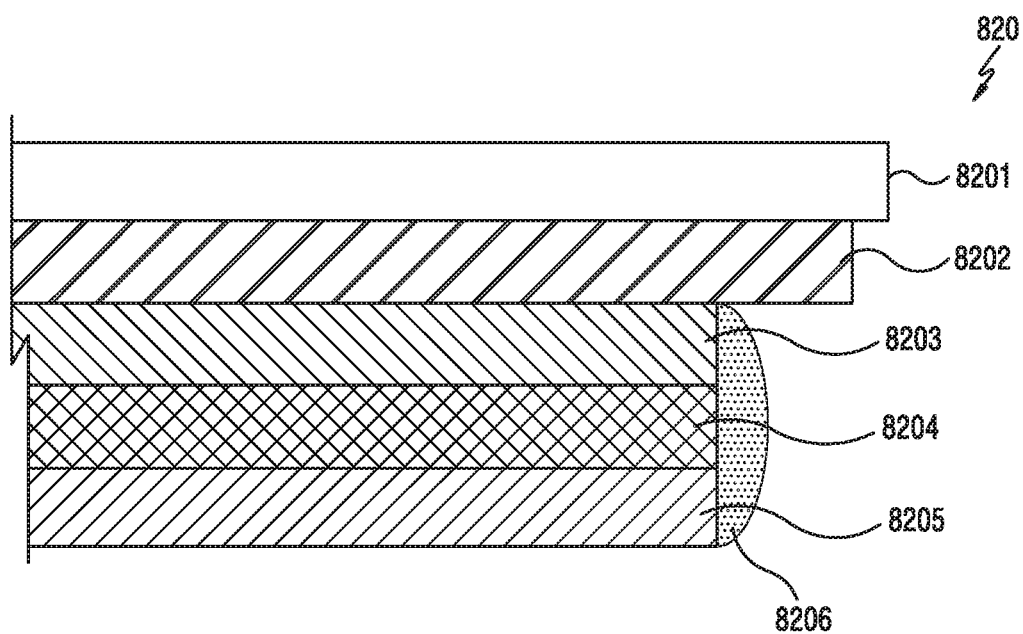
Figure 8K:
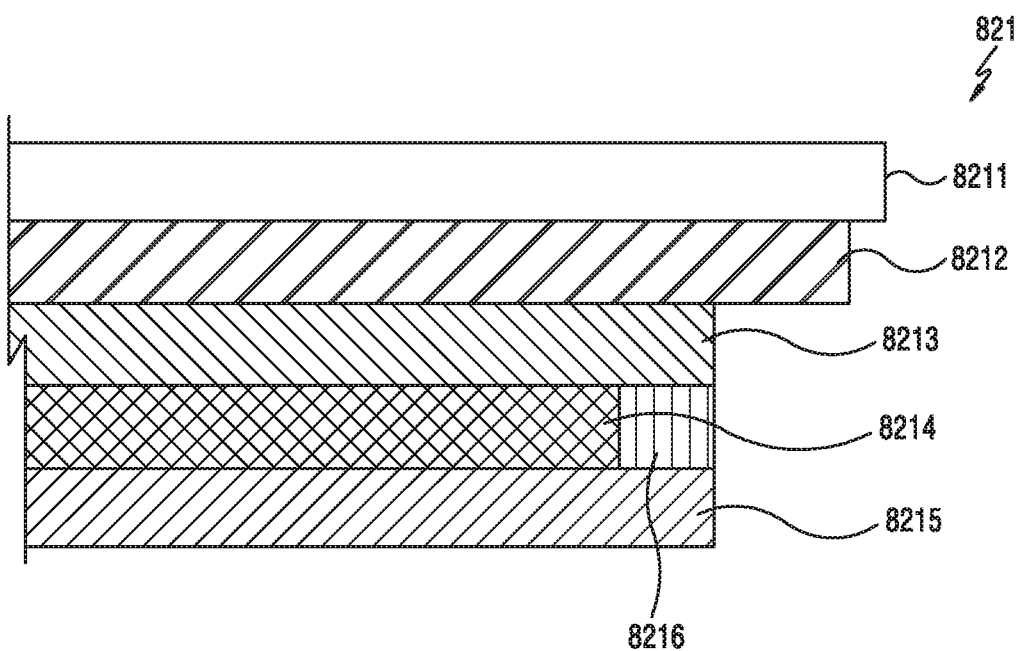
Figure 8L:
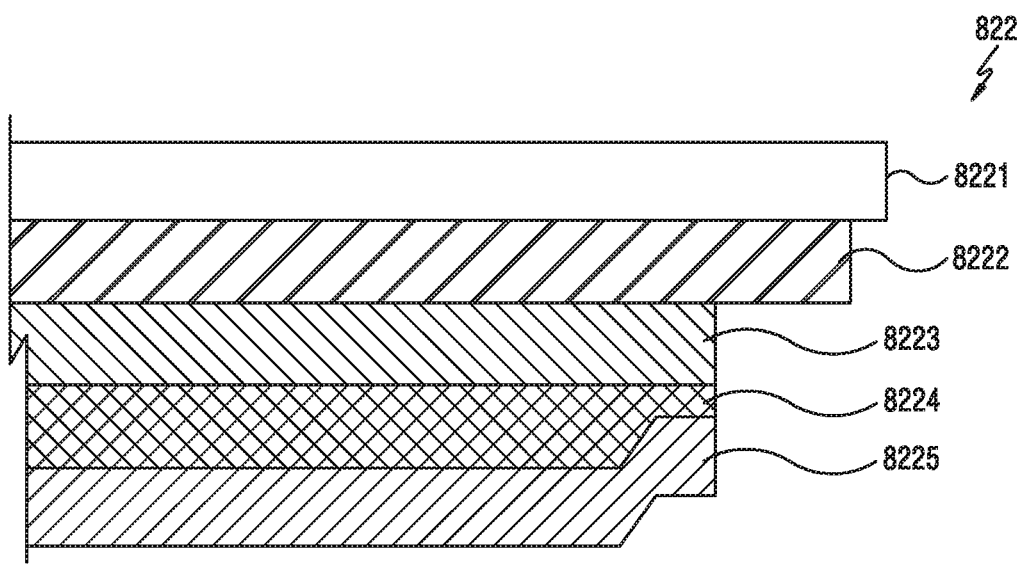
Figure 8M:
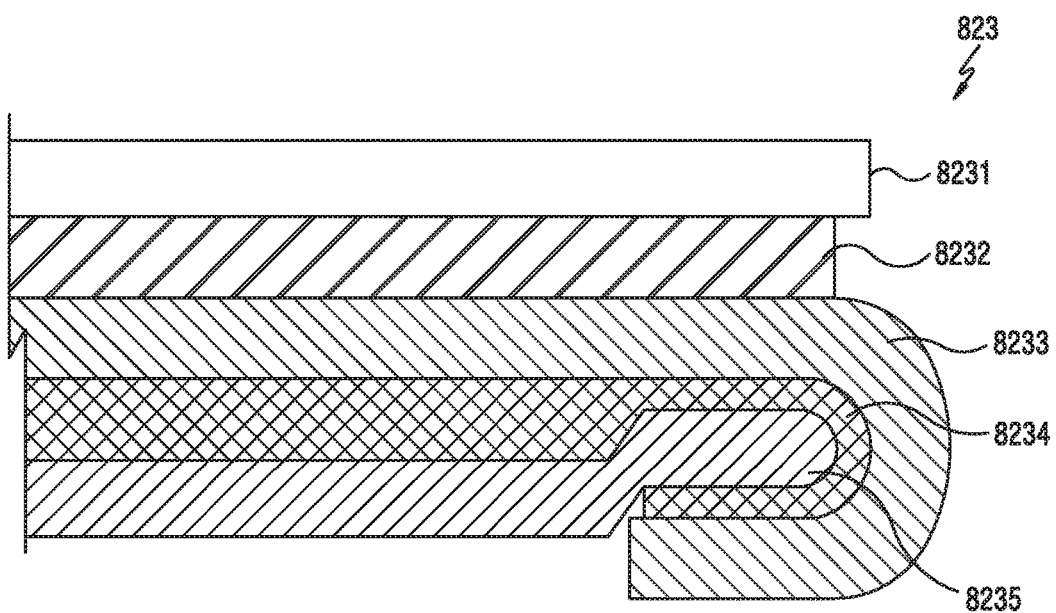
Figure 8N:
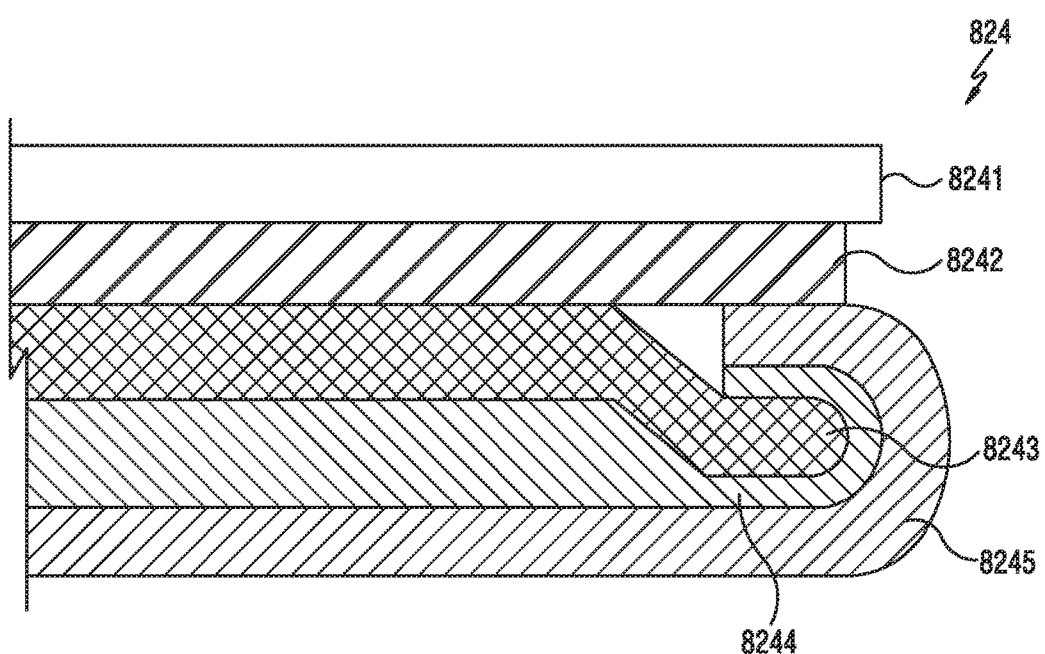
Figure 8O:
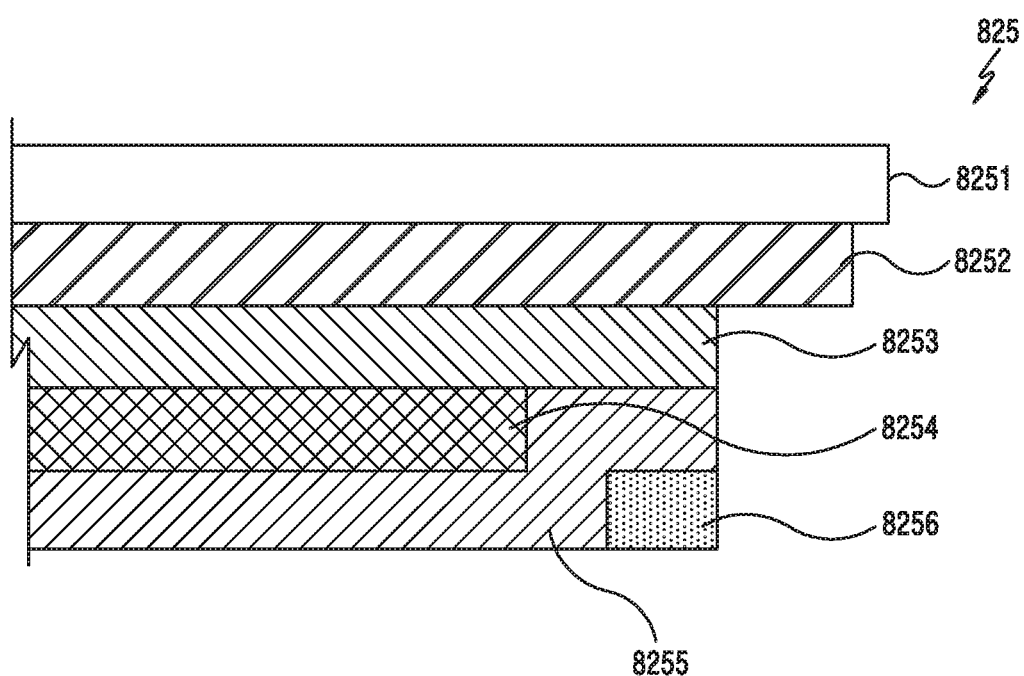
Figure 8P:
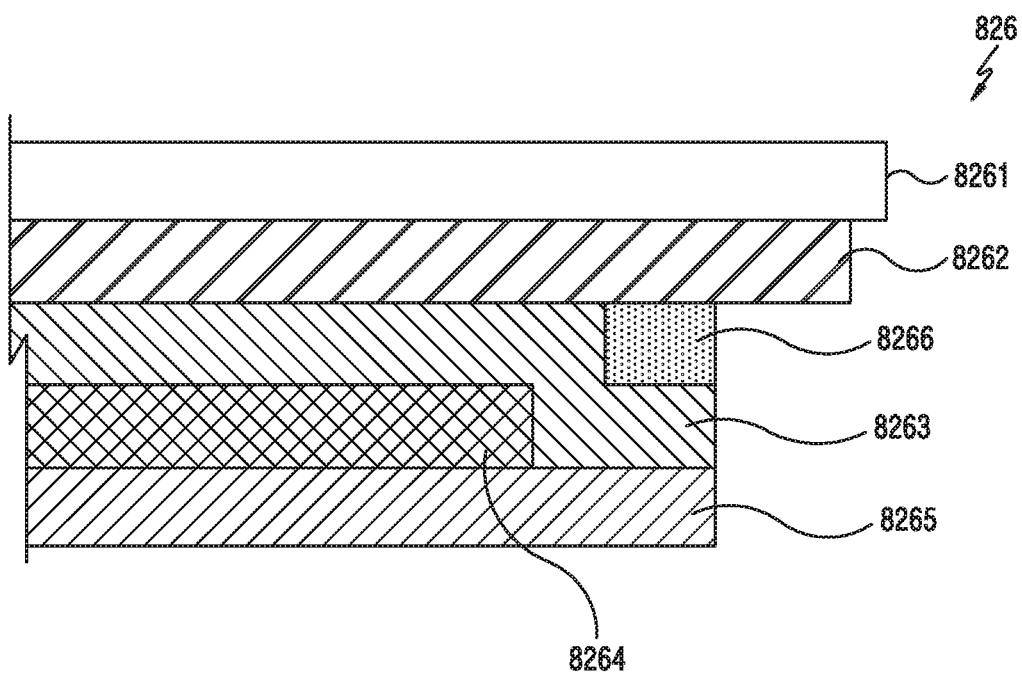
Figure 8Q:
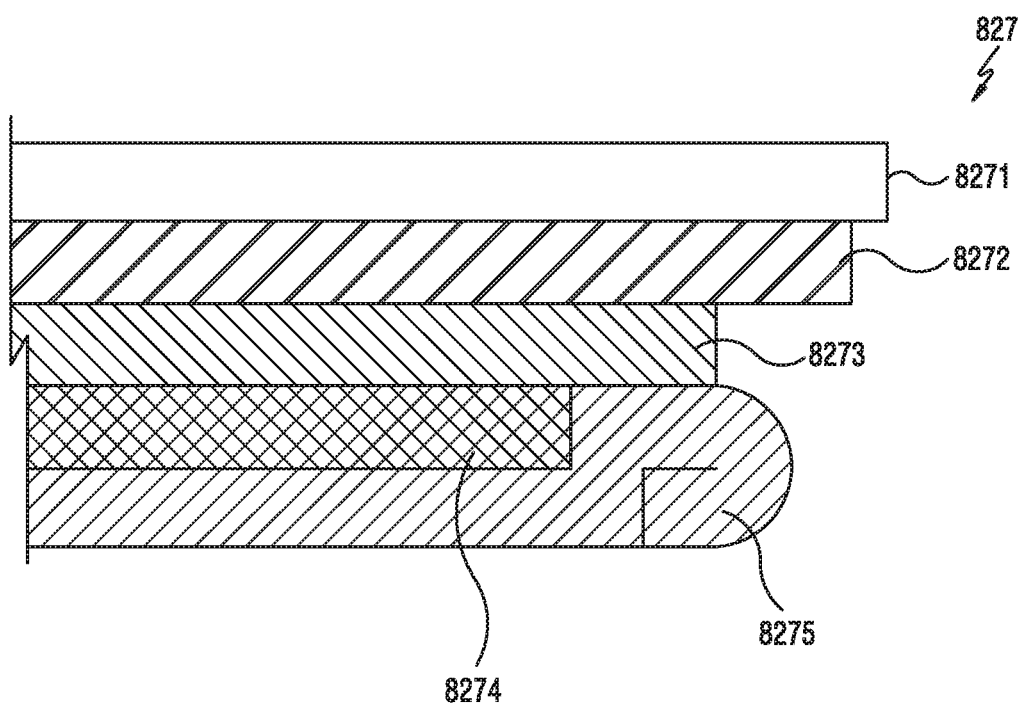
Figure 8R:
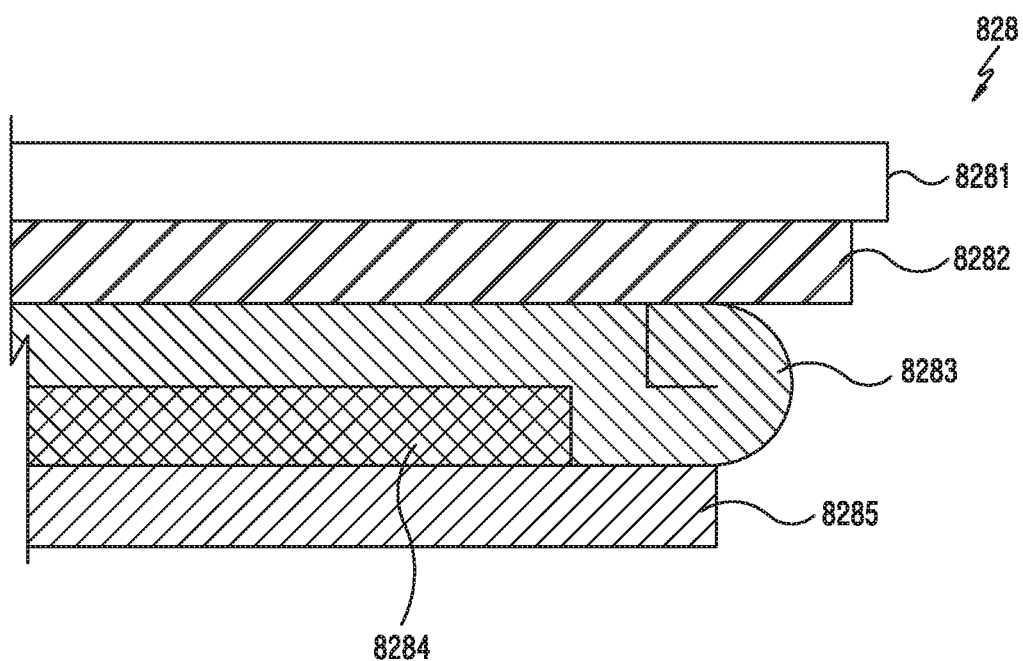

FIG. 8A to FIG. 8R are cross sections of a display including a waterproof structure for a non-waterproof member according to various exemplary embodiments of the present invention.

In various exemplary embodiments in which waterproof structures for non-waterproof members illustrated respectively in FIG. 8A to FIG. 8R are implemented by peripheral members, the peripheral members have been described as a first member and a second member. However, the first member and the second member may include the aforementioned polymer member and/or conductive member. However, an exemplary embodiment is not limited to this, and the first member and the second member may include a tape, an FPCB, a glue agent, a sponge, a thin film metal, a thin film plastic sheet, a urethane film or a PET film as well.

Referring to FIG. 8A, a display 811 may include a window 8111, and a display module 8112 arranged in a rear surface of the window 8111. According to one exemplary embodiment, a first member 8113, a non-waterproof member 8114 and a second member 8115 may be sequentially laminated on a rear surface of the display module 8112. According to one exemplary embodiment, the non-waterproof member 8114 may be constructed to have a waterproof structure by means of a junction process that is carried out along edges of the first member 8113 and the second member 8115. According to one exemplary embodiment, a waterproof structure for the non-waterproof member 8114 may be implemented through a cutting process in which the first member 8113 and the second member 8115 are joined with each other along edges of the first member 8113 and the second member 8115 and then are cut out as much as a constant amount.

Referring to FIG. 8B, a display 812 may include a window 8121, and display module 8122 arranged in a rear surface of the window 8121. According to one exemplary embodiment, a first member 8123, a non-waterproof member 8124 and a second member 8125 may be sequentially laminated on a rear surface of the display module 8122. According to one exemplary embodiment, a waterproof structure for the non-waterproof member 8124 may be implemented in such a manner that the second member 8125 detours to surround along an edge of the non-waterproof member 8124 and joins with a side surface of the first waterproof member 8123.

Referring to FIG. 8C, a display 813 may include a window 8131, and a display module 8132 arranged in a rear surface of the window 8131. According to one exemplary embodiment, a first member 8133, a non-waterproof member 8134 and a second member 8135 may be sequentially laminated on a rear surface of the display module 8132. According to one exemplary embodiment, a waterproof structure for the non-waterproof member 8134 may be implemented in such a manner that after the first member 8133 and the second member 8135 are joined to each other, their ends are folded in the direction of the second member 8135 and attached to a rear surface of the second member 8135. According to one exemplary embodiment, the folded ends of the first member 8133 and the second member 8135 may be arranged inside a waterproof line of an electronic device as well.

Referring to FIG. 8D, a display 814 may include a window 8141, and a display module 8142 arranged in a rear surface of the window 8141. According to one exemplary embodiment, a first member 8143, a non-waterproof member 8144 and a second member 8145 may be sequentially laminated on a rear surface of the display module 8142. According to one exemplary embodiment, a waterproof structure for the non-waterproof member 8144 may be implemented in such a manner that the first member 8143 detours up to side surfaces of the non-waterproof member 8144 and the second member 8145 along edges of the non-waterproof member 8144 and the second member 8145 and joins with the side surfaces of the non-waterproof member 8144 and the second member 8145.

Referring to FIG. 8E, a display 815 may include a window 8151, and a display module 8152 arranged in a rear surface of the window 8151. According to one exemplary embodiment, a first member 8153, a non-waterproof member 8154 and a second member 8155 may be sequentially laminated on a rear surface of the display module 8152. According to one exemplary embodiment, a waterproof structure for the non-waterproof member 8154 may be implemented in such a manner that the first member 8153 surrounds a side surface of the display module 8152 while being attached to a rear surface of the window 8151, and the second member 8155 detours to surround along an edge of the non-waterproof member 8154 and joins with a rear surface of the first member 8153 attached to the window 8151.

Referring to FIG. 8F, a display 816 may include a window 8161, and a display module 8162 arranged in a rear surface of the window 8161. According to one exemplary embodiment, a first member 8163, a non-waterproof member 8164 and a second member 8165 may be sequentially laminated on a rear surface of the display module 8162. According to one exemplary embodiment, a waterproof structure for the non-waterproof member 8164 may be implemented in such a manner that the second member 8165 detours to surround along edges of the non-waterproof member 8164 and the first member 8163 and joins with a rear surface of the display module 8162.

Referring to FIG. 8G, a display 817 may include a window 8171, and a display module 8172 arranged in a rear surface of the window 8171. According to one exemplary embodiment, a first member 8173, a non-waterproof member 8174 and a second member 8175 may be sequentially laminated on a rear surface of the display module 8172. According to one exemplary embodiment, a waterproof structure for the non-waterproof member 8174 may be implemented in such a manner that after the first member 8173 detours up to a rear surface of the second member 8175 via a side surface of the non-waterproof member 8174 along edges of the non-waterproof member 8174 and the second member 8175, an end of the first member 8173 joins with the rear surface of the second member 8175. According to one exemplary embodiment, the folded end of the first member 8173 may be arranged inside a waterproof line of an electronic device as well.

Referring to FIG. 8H, a display 818 may include a window 8181, and a display module 8182 arranged in a rear surface of the window 8181. According to one exemplary embodiment, a first member 8183, a non-waterproof member 8184 and a second member 8185 may be sequentially laminated on a rear surface of the display module 8182. According to one exemplary embodiment, a waterproof structure for the non-waterproof member 8184 may be implemented in such a manner that the first member 8183 is bent in the direction (e.g., down direction) of the non-waterproof member 8184 to surround a partial region of a side surface of the non-waterproof member 8184, and the second member 8185 is bent in the direction (e.g., up direction) of the non-waterproof member 8184 to surround a partial region of the side surface of the non-waterproof member 8184 and then, the first member 8183 and the second member 8185 are mutually met and joined at their ends 8186.

Referring to FIG. 8I, a display 819 may include a window 8191, and a display module 8192 arranged in a rear surface of the window 8191. According to one exemplary embodiment, a first member 8193, a non-waterproof member 8194 and a second member 8195 may be sequentially laminated on a rear surface of the display module 8192. According to one exemplary embodiment, a waterproof structure for the non-waterproof member 8194 may be implemented through a single-sided tape member 8196 which surrounds a side surface region of the non-waterproof member 8194 exposed to moisture and whose each outer surface is adhered to the first member 8193 and the second member 8195. According to one exemplary embodiment, the non-waterproof member 8194 may be attached to the first member 8193 and the second member 8195 by means of an adhesive layer arranged in each of the first member 8193 and the second member 8195.

Referring to FIG. 8J, a display 820 may include a window 8201, and a display module 8202 arranged in a rear surface of the window 8201. According to one exemplary embodiment, a first member 8203, a non-waterproof member 8204 and a second member 8205 may be sequentially laminated on a rear surface of the display module 8202. According to one exemplary embodiment, a waterproof structure for the non-waterproof member 8204 may be implemented in such a manner that all of a side surface region of the non-waterproof member 8204 exposed to moisture and side surfaces of the first member 8203 and the second member 8205 are bonded mutually by a bonding member 8206. However, an exemplary embodiment is not limited to this, and only a side surface of the non-waterproof member 8204 other than the first and second members 8203 and 8205 may be processed by a coating type member such as bonding, dispenser, spray or the like as well.

Referring to FIG. 8K, a display 821 may include a window 8211, and a display module 8212 arranged in a rear surface of the window 8211. According to one exemplary embodiment, a first member 8213, a non-waterproof member 8214 and a second member 8215 may be sequentially laminated on a rear surface of the display module 8212. According to one exemplary embodiment, a waterproof structure for the non-waterproof member 8214 may be implemented using a liquid-state or solid-state curing agent 8216 that is applied to surround a side surface region of the non-waterproof member 8214 exposed to moisture. However, an exemplary embodiment is not limited to this, and an exterior of the non-waterproof member 8214 is partially waterproof processed and constructed such that a side surface of the non-waterproof member 8214 has a waterproof structure.

Referring to FIG. 8L, a display 822 may include a window 8221, and a display module 8222 arranged in a rear surface of the window 8221. According to one exemplary embodiment, a first member 8223, a non-waterproof member 8224 and a second member 8225 may be sequentially laminated on a rear surface of the display module 8222. According to one exemplary embodiment, a waterproof structure for the non-waterproof member 8224 may be implemented by scaling down a side surface region of the non-waterproof member 8224 exposed to moisture.

Referring to FIG. 8M, a display 823 may include a window 8231, and a display module 8232 arranged in a rear surface of the window 8231. According to one exemplary embodiment, a first member 8233, a non-waterproof member 8234 and a second member 8235 may be sequentially laminated on a rear surface of the display module 8232. According to one exemplary embodiment, a side surface region of the non-waterproof member 8234 exposed to moisture may be scaled down in thickness. According to one exemplary embodiment, a waterproof structure for the non-waterproof member 8234 may be implemented in such a manner that after the first member 8233 and the non-waterproof member 8234 are joined to each other, ends of the first member 8233 and the non-waterproof member 8234 are folded along an edge of the second member 8235 and attached to a rear surface of the second member 8235. According to one exemplary embodiment, the folded ends of the first member 8233 and the non-waterproof member 8234 may be arranged inside a waterproof line of an electronic device as well.

Referring to FIG. 8N, a display 824 may include a window 8241, and a display module 8242 arranged in a rear surface of the window 8241. According to one exemplary embodiment, a first member 8243, a non-waterproof member 8244 and a second member 8245 may be sequentially laminated on a rear surface of the display module 8242. According to one exemplary embodiment, a side surface region of the non-waterproof member 8244 exposed to moisture may be reduced in thickness. According to one exemplary embodiment, a waterproof structure for the non-waterproof member 8244 may be implemented in such a manner that after the non-waterproof member 8244 and the second member 8245 are joined to each other, ends of the non-waterproof member 8244 and the second member 8245 are folded in the direction of the first member 8243 such that the second member 8245 is attached to the rear surface of the display module 8242.

Referring to FIG. 8O, a display 825 may include a window 8251, and a display module 8252 arranged in a rear surface of the window 8251. According to one exemplary embodiment, a first member 8253, a non-waterproof member 8254 and a second member 8255 may be sequentially laminated on a rear surface of the display module 8252. According to one exemplary embodiment, a waterproof structure for the non-waterproof member 8254 may be implemented in such a manner that the second member 8255 detours to surround a side surface of the non-waterproof member 8254 and is attached to a rear surface of the first member 8253. According to one exemplary embodiment, a finishing member (e.g., an interposer) 8256 may be applied to a bent step space of the second member 8255. According to one exemplary embodiment, the finishing member 8256 may include a separate film, tape or sheet.

Referring to FIG. 8P, a display 826 may include a window 8261, and a display module 8262 arranged in a rear surface of the window 8261. According to one exemplary embodiment, a first member 8263, a non-waterproof member 8264 and a second member 8265 may be sequentially laminated on a rear surface of the display module 8262. According to one exemplary embodiment, a waterproof structure for the non-waterproof member 8264 may be implemented in such a manner that the first member 8263 detours to surround a side surface of the non-waterproof member 8264 and is attached to a top surface of the second member 8265. According to one exemplary embodiment, a finishing member (e.g., an interposer) 8266 may be applied to a bent step space of the first member 8263. According to one exemplary embodiment, the finishing member 8266 may include a separate film, tape or sheet.

Referring to FIG. 8Q, a display 827 may include a window 8271, and a display module 8272 arranged in a rear surface of the window 8271. According to one exemplary embodiment, a first member 8273, a non-waterproof member 8274 and a second member 8275 may be sequentially laminated on a rear surface of the display module 8272. According to one exemplary embodiment, a waterproof structure for the non-waterproof member 8274 may be implemented in such a manner that the second member 8275 detours to surround a side surface of the non-waterproof member 8274 and is attached to a rear surface of the first member 8273. According to one exemplary embodiment, a bent step space of the second member 8275 may be finished and filled in such a manner that an end of the second member 8275 is twice folded in a lower direction.

Referring to FIG. 8R, a display 828 may include a window 8281, and a display module 8282 arranged in a rear surface of the window 8281. According to one exemplary embodiment, a first member 8283, a non-waterproof member 8284 and a second member 8285 may be sequentially laminated on a rear surface of the display module 8282. According to one exemplary embodiment, a waterproof structure for the non-waterproof member 8284 may be implemented in such a manner that the first member 8283 detours to surround a side surface of the non-waterproof member 8284 and is attached to a top surface of the second member 8285. According to one exemplary embodiment, a bent step space of the first member 8283 may be finished and filled in such a manner that an end of the first member 8283 is twice folded in an upper direction.

Figure 9:
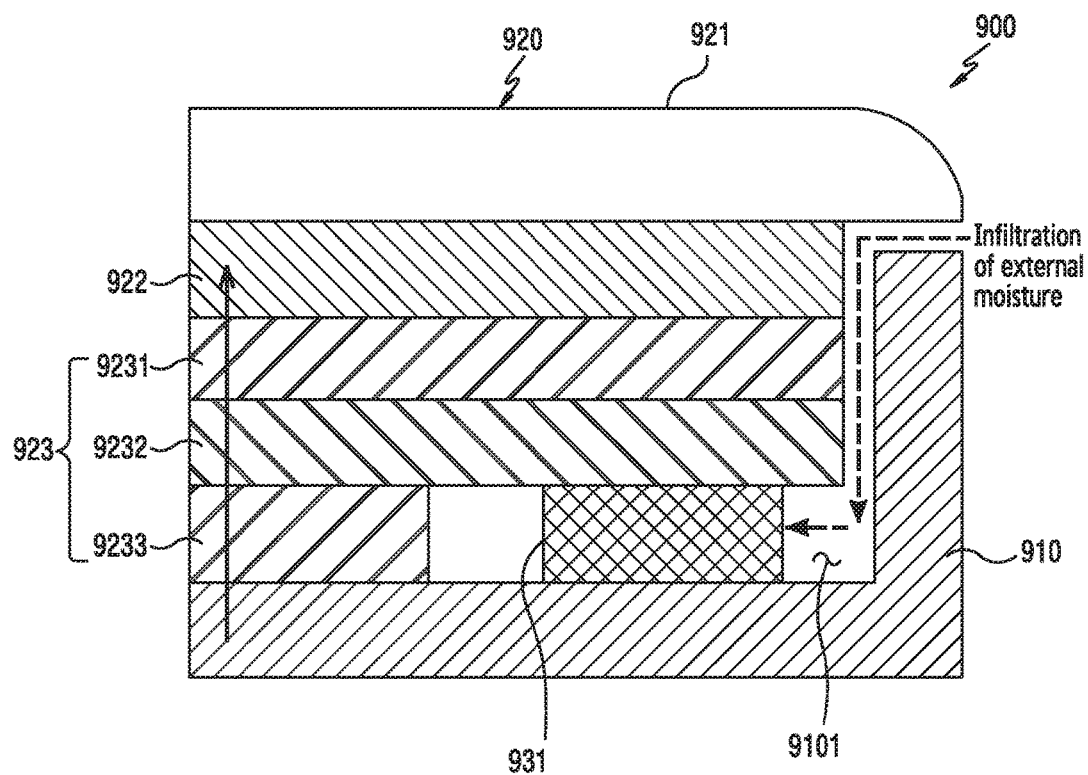
FIG. 9 is a cross section of an electronic device including a waterproof structure for a non-waterproof member according to various exemplary embodiments of the present invention.

FIG. 9 is a cross section of an electronic device including a waterproof structure for a non-waterproof member according to various exemplary embodiments of the present invention.

The electronic device 900 of FIG. 9 may be similar to the electronic device 100 of FIG. 1 and FIG. 2 or the electronic device 300 of FIG. 3, or be an electronic device of another exemplary embodiment.

Referring to FIG. 9, the electronic device 900 may include a display 920 attached in front of a housing 910 by means of a seal member 931. Though not illustrated, the electronic device 900 may include a rear window attached in rear of the housing 910 by means of a rear seal member. According to one exemplary embodiment, the housing 910 may be provided with an airtight internal space for waterproof by means of the seal member 931 attached to the display 920.

According to various exemplary embodiments, the display 920 may include a window 921, a display module 922 arranged in a rear surface of the window 921, and at least one laminated member 923 arranged in a rear surface of the display module 922. According to one exemplary embodiment, the at least one laminated member 923 may include a polymer member 9231 (e.g., a polymer layer), a conductive member 9232 (e.g., a conductive layer), and a non-waterproof member 9233 (e.g., a moisture sensitive layer) that are sequentially laminated on the rear surface of the display module 922. According to one exemplary embodiment, the polymer member 9231 may be attached to the rear surface of the display module 922, using an adhesive agent (e.g., an OCA, a PSA, a general adhesive agent or bonding agent and a heat reactive adhesive agent), and may perform an absorbing action. According to one exemplary embodiment, the polymer member 9231 may apply a dark color (e.g., black)

to give a help to background showing at display off. According to one exemplary embodiment, the conductive member 9232 may include a metal member for shielding a noise and dispersing a heat emitted from a peripheral heat emitting component. According to one exemplary embodiment, the metal member may include copper (Cu). According to one exemplary embodiment, the non-waterproof member 9233, materials vulnerable to moisture, may include an added display, a force touch FPCB, a fingerprint scan sensor FPCB, a communicating antenna radiator, a heat radiating sheet, a conductive/non-conductive tape, an open cell sponge or a graphite sheet for heat radiation.

According to various exemplary embodiments, because the non-waterproof member 9233 is arranged in a waterproof space that is provided by the seal member 931 and the housing 910, the non-waterproof member 9233 may guarantee waterproof from moisture that is introduced through a moisture infiltration space 9101 between the window 921 and the housing 910. According to one exemplary embodiment, because the non-waterproof member 9233 is arranged in the waterproof space that is provided by the seal member 931 and the housing 910, the non-waterproof member 9233 may exclude a separate waterproof structure (e.g., a junction structure) used by the peripheral laminated member. According to one exemplary embodiment, the non-waterproof member 9233 may be attached to an outer surface of the housing 910 or be attached to a rear surface of the conductive member 9232.

Figure 10A:
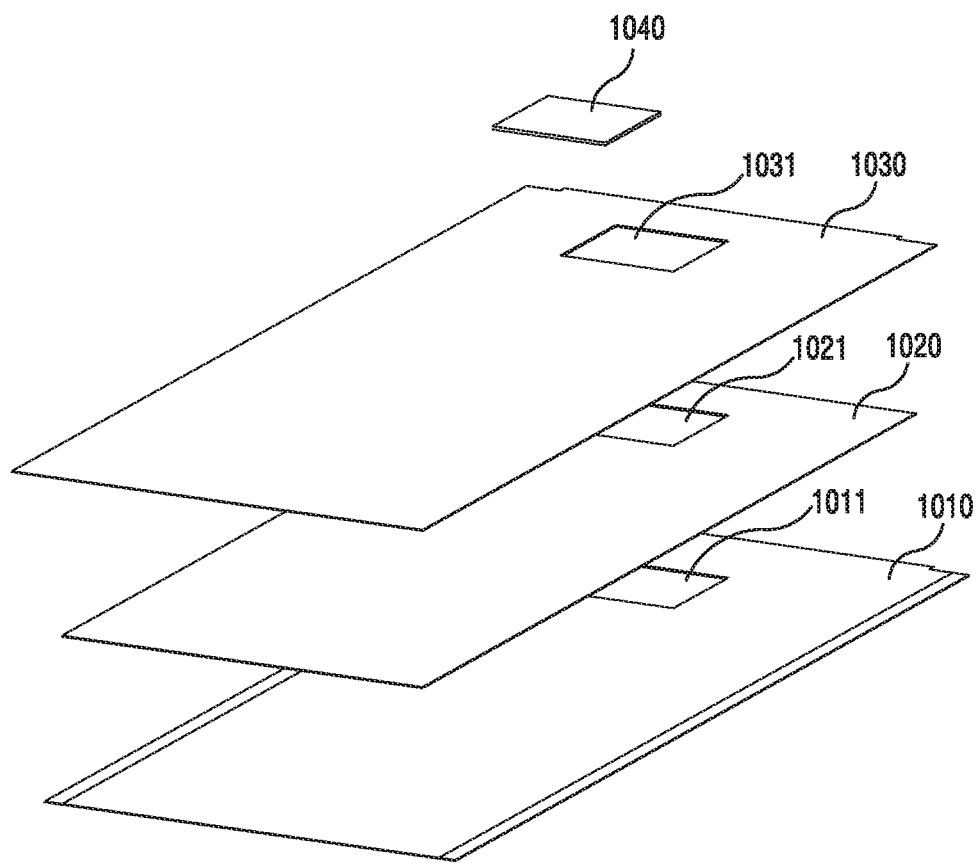
FIG. 10A to FIG. 10C are diagrams illustrating a state in which an electronic component located in a region overlapped with a display region is arranged through a waterproof structure for a non-waterproof member according to various exemplary embodiments of the present invention.
Figure 10B:
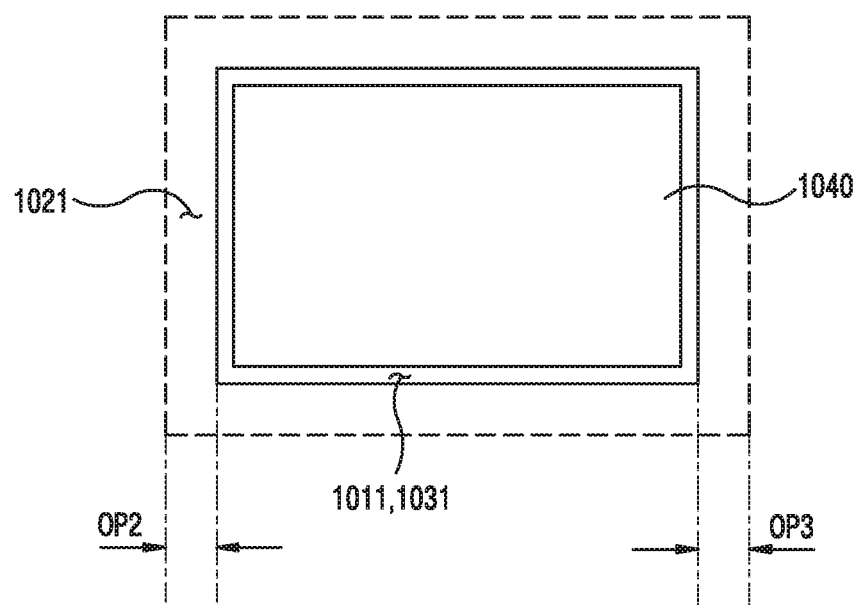
Figure 10C:
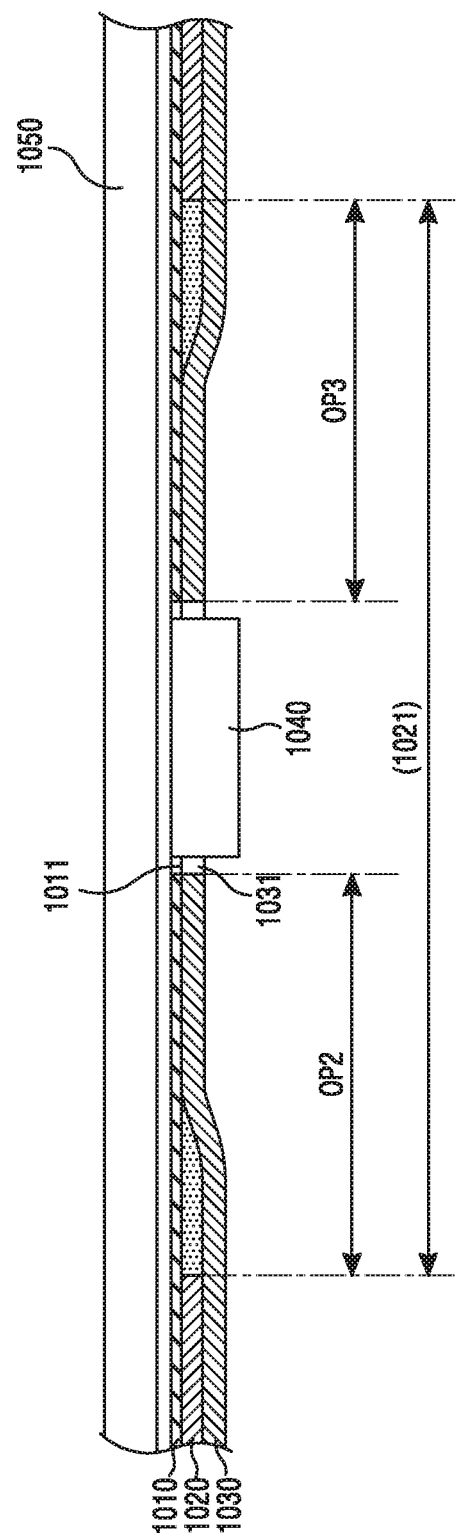

FIG. 10A to FIG. 10C are diagrams illustrating a state in which an electronic component located in a region overlapped with a display region is arranged through a waterproof structure for a non-waterproof member according to various exemplary embodiments of the present invention.

In various exemplary embodiments in which waterproof structures for the non-waterproof members illustrated in FIG. 10A to FIG. 10C are implemented by peripheral members, the peripheral members have been described as a first member and a second member. However, the first member and the second member may include the aforementioned polymer member and/or conductive member. However, an exemplary embodiment is not limited to this, and the first member and the second member may include a tape, an FPCB, a glue agent, a sponge, a thin film metal, a thin film plastic sheet, a urethane film or a PET film as well.

Referring to FIG. 10A to FIG. 10C, the non-waterproof member 1020 may be arranged and interposed between the first member 1010 and the second member 1030 at the rear surface of the display module 1050. According to one exemplary embodiment, as mentioned above, a waterproof structure for the non-waterproof member 1020 may be implemented by performing a junction process along edges of the first member 1010 and the second member 1030.

According to various exemplary embodiments, in case where at least one electronic component 1040 is arranged in a region overlapped with the non-waterproof member 1020, there may be a need for openings 1011, 1021 and 1031 that are provided such that the electronic components 1040 pass through. According to one exemplary embodiment, the first opening 1011 may be provided in an overlapped region of the first member 1010 corresponding to the electronic component 1040. According to one exemplary embodiment, the second opening 1021 may be provided in an overlapped region of the non-waterproof member 1020 corresponding to the electronic component 1040. According to one exemplary embodiment, the third opening 1031 may be provided in an overlapped region of the second member 1030 corresponding to the electronic component 1040. According to one exemplary embodiment, the second opening 1021 may be provided larger than the first opening 1011 and the third opening 1031. According to one exemplary embodiment, the first member 1010 and the second member 1030 may be mutually joined except for the non-waterproof member 1020, along edges of the first opening 1011 and the third opening 1031.

According to various exemplary embodiments, FIG. 10B and FIG. 10C illustrate junction regions (OP2 and OP3) that are formed at edges of the first opening 1011 and the third opening 1031 having smaller sizes than the second opening 1021. According to one exemplary embodiment, the first member 1010 and the second member 1030 may be joined to each other in the junction regions (OP2 and OP3) that are led in by a constant amount along the respective edges of the first opening 1011 of the first member 1010 and the third opening 1031 of the second member 1030. By doing so, the non-waterproof member 1020 may block moisture that may be introduced through the first and third openings 1011 and 1031.

Figure 11A:
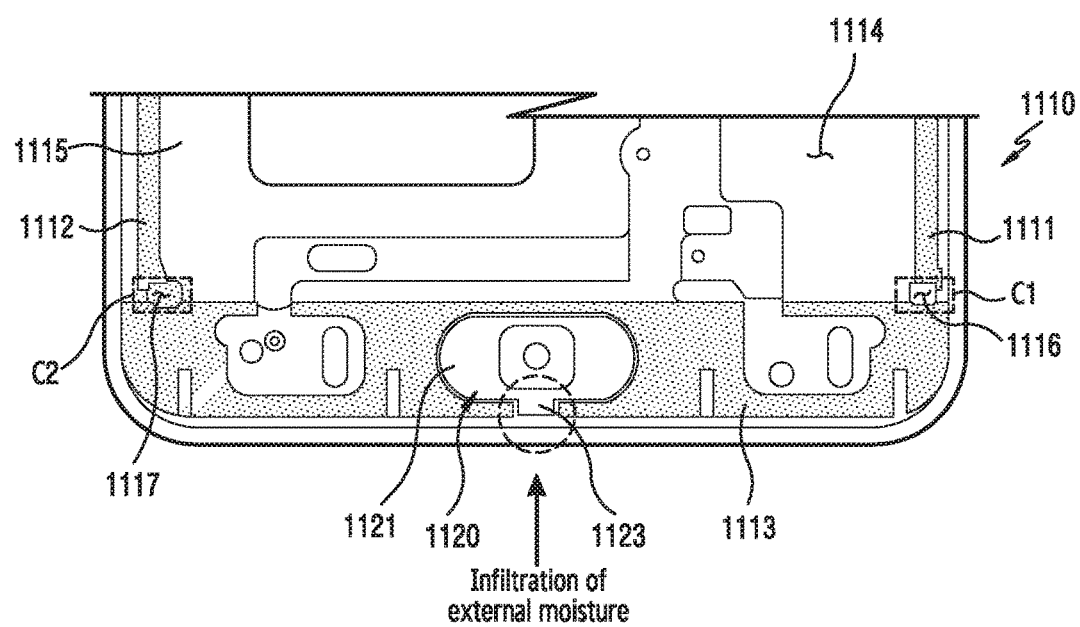
FIG. 11A and FIG. 11B are diagrams illustrating a waterproof structure for preventing moisture introduced from a key button installation region according to various exemplary embodiments of the present invention.
Figure 11B:
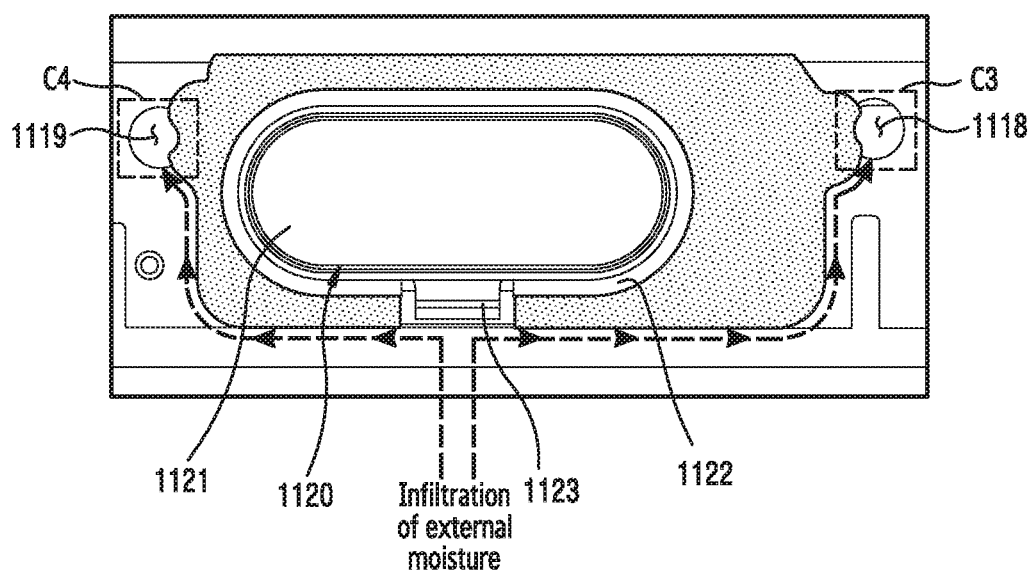

FIG. 11A and FIG. 11B are diagrams illustrating a waterproof structure for preventing moisture introduced from a key button installation region according to various exemplary embodiments of the present invention.

A housing 1110 including a plurality of seal members of FIG. 11A may be similar to a part of the housing 310 illustrated in FIG. 4A or be a housing of another exemplary embodiment.

Referring to FIG. 11A and FIG. 11B, the housing 1110 may provide an airtight space 1114 that prevents the infiltration of moisture by means of a plurality of seal members 1111, 1112, and 1113. According to one exemplary embodiment, the plurality of seal members 1111, 1112 and 1113 may include a first seal member 1111, a second seal member 1112, and a third seal member 1113. According to one exemplary embodiment, the first and second seal members 1111 and 1112 may be arranged at both left and right sides of the housing 1110 and be attached to a rear surface of a display module (not shown). According to one exemplary embodiment, the third seal member 1113 may be arranged at a lower side of the housing 1110 and be attached to a rear surface of the window (not shown). According to one exemplary embodiment, step regions (C1 and C2) resulting from a height difference between the display module and the window may be formed at boundary portions between the seal members 1111, 1112 and 1113, respectively. According to one exemplary embodiment, filling member injection holes 1116 and 1117 may be provided in corresponding locations of the housing 1110 corresponding to the step regions (C1 and C2). According to one exemplary embodiment, the housing 1110 may apply waterproofing filling members through the filing member injection holes 1116 and 1117. According to one exemplary embodiment, the housing 1110 may provide the airtight space 1114 by the respective seal members 1111, 1112 and 1113 and the waterproofing filling members applied to the step regions C1 and C2 through the filling member injection holes 1116 and 1117. According to one exemplary embodiment, the first, second and third seal member 1111, 1112 and 1113 may include at least one of a tape, an adhesive agent, waterproof dispenser, silicon, a waterproof rubber and urethane.

According to one exemplary embodiment, this airtight space may arrange at least one electronic component. According to one exemplary embodiment, the electronic component may include a key assembly 1120. According to one exemplary embodiment, as illustrated, the key assembly 1120 may be arranged within a waterproof region of the third seal member 1113. According to one exemplary embodiment, the key assembly 1120 may include a button part 1121, a bracket 1122 (e.g., a bracket 1222 of FIG. 12C), and an FPC 1123. The button part 1121 may be arranged to be exposed to the third seal member 1113 attached to the housing 1110. The bracket 1122 (e.g., the bracket 1222 of FIG. 12C) may support the button part 1121. The FPC 1123 may be arranged to intersect a partial region of the third seal member 1113 along the button part 1121.

According to various exemplary embodiments, the key assembly 1120 may be fixed in such a manner that, in a state in which the bracket 1122 equipped with the button part 1121 is arranged in the housing 1110, the third seal member 1113 is attached to corresponding regions of a top surface of the bracket 1122 and a front surface 1115 of the housing 1110. According to one exemplary embodiment, the key assembly 1120 may be additionally fixed to the housing 1110 by means of a separate screw or a self-combining structure as well. According to various exemplary embodiments, the bracket 1122 may be arranged in a front surface of the housing 1110. For example, the bracket 1122 may be arranged in such a manner that the bracket 1122 is safely mounted in a recess provided in the housing 1110. According to one exemplary embodiment, the assembled bracket 1122 and housing 1110 may generate an assembly tolerance (e.g., gap) and thus, though the third seal member 1113 is arranged on the assembled bracket 1122 and housing 1110, moisture may be introduced along a corresponding gap under the third seal member 1113. According to one exemplary embodiment, the housing 1110 may provide filling member injection holes 1118 and 1119 in arbitrary regions (C3 and C4) among lines along which a gap is formed, and apply waterproofing filling members to the filling member injection holes 1118 and 1119, thereby preventing the infiltration of moisture caused by an assembly structure of the key assembly 1120. According to one exemplary embodiment, the waterproofing filling members may include semi-solid state or liquid state materials, and include the property of being solidified by a natural or external condition (e.g., a heat, ultraviolet, a pressure, etc.).

FIG. 12A to FIG. 12D are diagrams illustrating a state in which a plurality of key assemblies are arranged in a waterproof region of an electronic device according to various exemplary embodiments of the present invention.

Figure 12A:
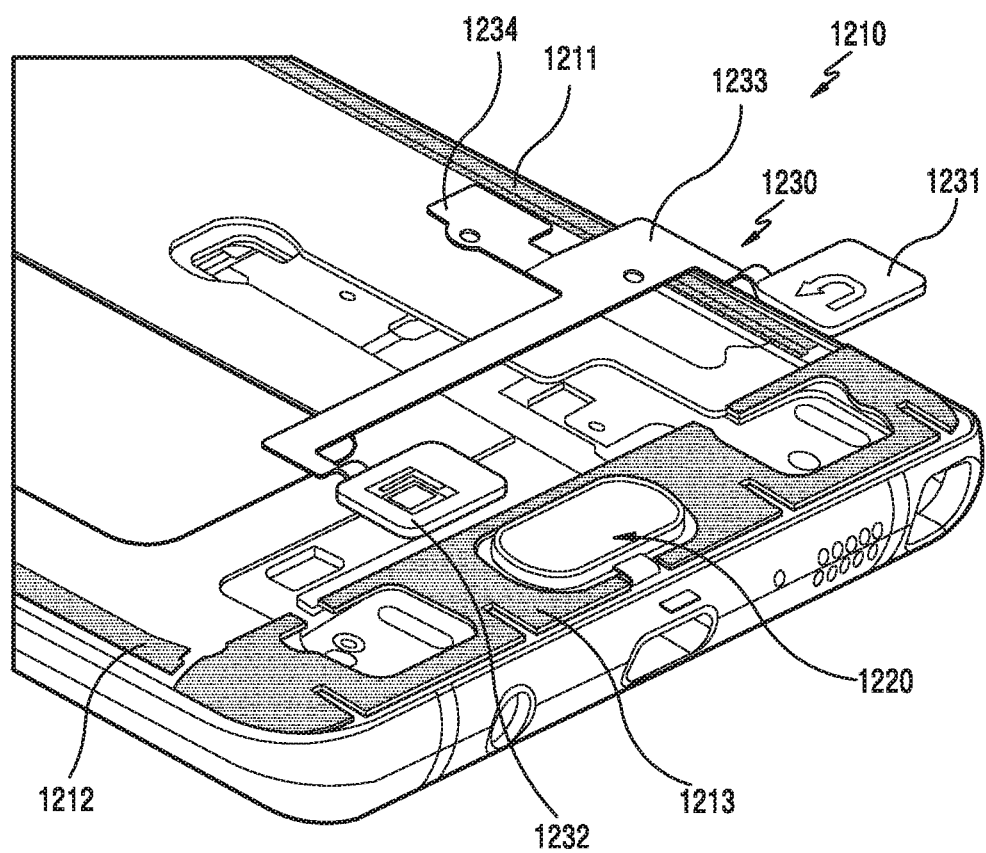
FIG. 12A to FIG. 12D are diagrams illustrating a state in which a plurality of key assemblies are arranged in a waterproof region of an electronic device according to various exemplary embodiments of the present invention.
Figure 12B:
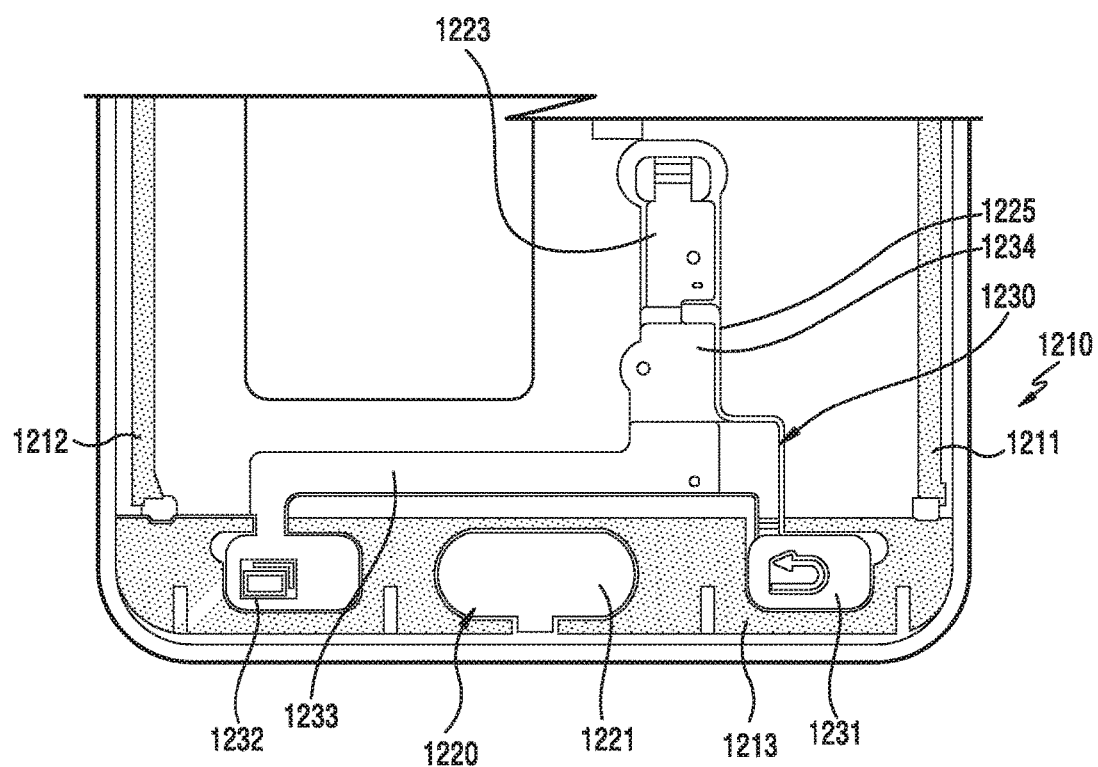
Figure 12C:
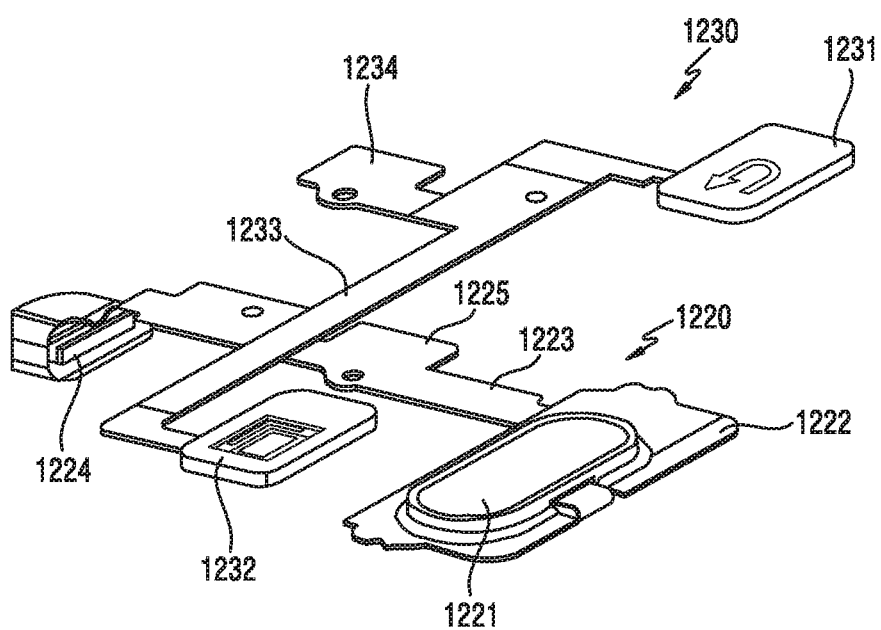
Figure 12D:
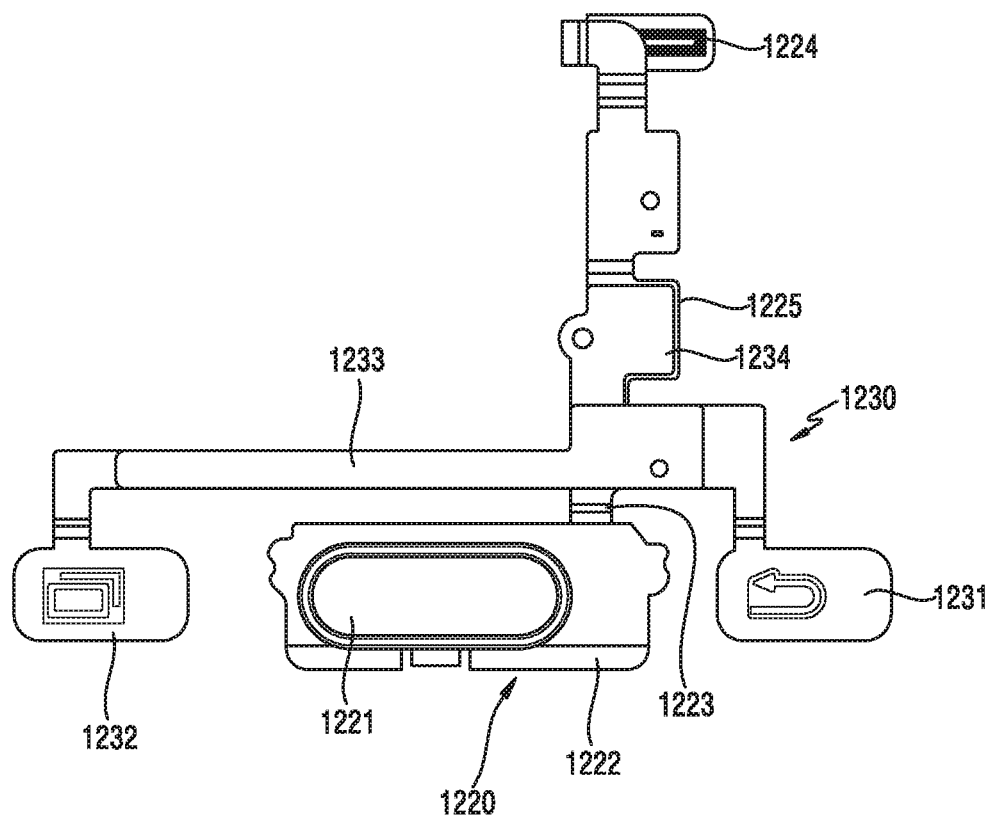

A housing 1210 including a plurality of seal members of FIG. 12A and FIG. 12B may be similar to a part of the housing 310 illustrated in FIG. 4A or the housing 1110 illustrated in FIG. 11A or be a housing of another exemplary embodiment.

Referring to FIG. 12A to FIG. 12D, the housing 1210 may provide an airtight space that prevents the infiltration of moisture by means of a plurality of seal members 1211, 1212 and 1213. According to one exemplary embodiment, the plurality of seal members 1211, 1212 and 1213 may include a first seal member 1211, a second seal member 1212, and a third seal member 1213. According to one exemplary embodiment, the first and second seal members 1211 and 1212 may be arranged at both left and right sides of the housing 1210 and be attached to a rear surface of a display module (not shown). According to one exemplary embodiment, the third seal member 1213 may be arranged at a lower side of the housing 1210 and be attached to a rear surface of a window (not shown).

According to various exemplary embodiments, a key input device may be arranged in a lower region of the housing 1210 in which the third seal member 1213 is arranged. According to one exemplary embodiment, the key input device may include a first key assembly 1220 and a second key assembly 1230. According to one exemplary embodiment, the first key assembly 1220 may include a physical key button device of an electronic device. According to one exemplary embodiment, the second key assembly 1230 may include a touch pad device of the electronic device. According to one exemplary embodiment, the first key assembly 1220 and the second key assembly 1230 may be unified and be electrically coupled by one connector with a substrate (not shown) arranged within the housing 1210.

According to various exemplary embodiments, the first key assembly 1220 may include a button part 1221, a bracket 1222, and a first FPC 1223 of a constant length. The button part 1221 may be exposed to the external of the electronic device when the first key assembly 1220 is installed in the housing 1210. The bracket 1222 may support the button part 1221. The first FPC 1223 may include a connector 1224 at its end that is drawn from the button part 1221 and electrically coupled to a substrate of the electronic device through the housing 1210. According to one exemplary embodiment, the first key assembly 1220 may include a first connection part 1225 that is branched from at least a part of the first FPC 1223.

According to various exemplary embodiments, the second key assembly 1230 may include at least one key pad 1231 or 1232, a second FPC 1233, and a second connection part 1234. When the second key assembly 1230 is installed in the housing 1210, the at least one key pad 1231 or 1232 may be at least partially exposed to the external of the electronic device. The second FPC 1233 may be drawn a constant length from the at least one key pad 1231 or 1232. The second connection part 1234 may be branched from the second FPC 1233 or formed at an end of the second FPC 1233.

According to various exemplary embodiments, the first key assembly 1220 and the second key assembly 1230 may be arranged in the housing 1210. The first connection part 1225 and the second connection part 1234 may be arranged in an overlapping manner and be electrically coupled with each other. According to one exemplary embodiment, the second key assembly 1230 may be electrically coupled to the substrate through the connector 1224 of the first key assembly 1220 via the second connection part 1234 electrically coupled with the first connection part 1225. According to one exemplary embodiment, the first connection part 1225 and the second connection part 1234 may be electrically coupled with each other, using an Anisotropic Conductive Film (ACF) or by a soldering process.

According to various exemplary embodiments of the present invention, an electronic device is constructed such that a non-waterproof member included to maximally exhibit a desired function is not exposed to moisture, whereby an excellent waterproof structure may be implemented and due to this, a working reliability may be improved.

According to various exemplary embodiments, an electronic device may include a housing, a window arranged in at least a part of the housing, a display module arranged in a rear surface of the window, a heat radiating member arranged in a rear surface of the display module, a polymer member arranged between a first surface of the heat radiating member and the rear surface of the display module, and a conductive member arranged in a second surface of the heat radiating member facing the first surface of the heat radiating member. A waterproof structure for the heat radiating member may be configured using at least one of the polymer member and the conductive member.

According to various exemplary embodiments, the heat radiating member may include graphite.

According to various exemplary embodiments, the conductive member may include copper (Cu).

According to various exemplary embodiments, the polymer member may include urethane.

According to various exemplary embodiments, the electronic device may further include a first adhesive layer arranged between the polymer member and the heat radiating member, and a second adhesive layer arranged between the conductive member and the heat radiating member.

According to various exemplary embodiments, the electronic device may further include a heat emitting element within the housing. The heat radiating member may be arranged in a location of dispersing a heat emitted from the heat emitting element.

According to various exemplary embodiments, the electronic device may further include a polymer structure that surrounds the polymer member, the conductive member and the heat radiating member.

According to various exemplary embodiments, an electronic device may include a housing, a window arranged in at least a partial region of the housing, a display module attached to a rear surface of the window, a first member arranged in a rear surface of the display module, a second member arranged in a rear surface of the first member, and a third member arranged between the first member and the second member, and waterproof processed by at least one member among the first member and the second member. The first member and/or the second member may have a relatively superior waterproof performance than the third member.

According to various exemplary embodiments, the first member and/or the second member may include at least one of a tape, a FPCB, a glue agent, a sponge, urethane, a thin film metal, a thin film plastic sheet, a urethane film or a PET film.

According to various exemplary embodiments, the third member may include at least one of an added display, a force touch FPCB, a fingerprint scan sensor FPCB, a communicating antenna radiator, a heat radiating sheet, a conductive/non-conductive tape, an open cell sponge or a graphite sheet.

According to various exemplary embodiments, the third member may be waterproof processed by a junction structure between the first member and the second member.

According to various exemplary embodiments, the third member may be formed smaller in size than the first member and the second member, and the junction structure joins along edges of the first member and the second member except for the third member.

According to various exemplary embodiments, the first member and the second member are joined to each other by at least one of ultrasonic fusion, pressing, bonding or a separate adhesive means.

According to various exemplary embodiments, the first member may include a sponge for absorbing, and the second member may include a conductive sheet for heat radiating and noise shielding, and the third member may include a graphite for emitting a heat that is generated from a heat emitting element arranged around the third member.

According to various exemplary embodiments, the junction structure may be configured such that the first member or the second member detours to surround a side surface of the third member and is joined to the remnant second member or first member.

According to various exemplary embodiments, the junction structure may be configured such that a waterproof member is arranged to at least include a side surface region of the third member.

According to various exemplary embodiments, the waterproof member may include at least one of a taping member, a curing agent or a glue agent that is arranged to surround at least the entire side surface of the third member.

According to various exemplary embodiments, the electronic device may include an EMR sensor pad that is arranged below the display module and operates in an electromagnetic induction scheme to detect an input of an electronic pen.

According to various exemplary embodiments, the first member, the third member, and the second member are sequentially laminated and attached to the rear surface of the display module by an adhesive agent.

According to various exemplary embodiments, an electronic device may include a housing, a window arranged in at least a partial region of the housing, a display module attached to a rear surface of the window, an absorbing member attached to a rear surface of the display module, a graphite member for heat radiation, attached to a rear surface of the absorbing member, and a copper member arranged beneath the graphite member, and joined to at least a part of the absorbing member. The graphite member may be configured to have a waterproof structure that prevents the infiltration of external moisture by a junction structure between the absorbing member and the copper member.

Various exemplary embodiments of the present invention disclosed in the specification and the drawings merely propose specific examples so as to easily explain the technological content according to the exemplary embodiment of the present invention and help the understanding of an exemplary embodiment of the present invention, and do not intend to limit the spirit and scope of the exemplary embodiment of the present invention. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a housing;
   a window arranged in at least a part of the housing;
   a display module arranged in a rear surface of the window;
   a heat radiating member arranged in a rear surface of the display module;
   a polymer member arranged between a first surface of the heat radiating member and the rear surface of the display module; and
   a conductive member arranged in a second surface of the heat radiating member opposite to the first surface of the heat radiating member,
   wherein a waterproof structure for the heat radiating member is configured using at least one of the polymer member or the conductive member.

2. The electronic device of claim 1, wherein the heat radiating member comprises graphite.

3. The electronic device of claim 1, wherein the conductive member comprises copper (Cu).

4. The electronic device of claim 1, wherein the polymer member comprises urethane.

5. The electronic device of claim 1, further comprising:
a first adhesive layer arranged between the polymer member and the heat radiating member; and
a second adhesive layer arranged between the conductive member and the heat radiating member.

6. The electronic device of claim 1, further comprising a heat emitting element within the housing,
wherein the heat radiating member is arranged in a location for dispersing heat emitted by the heat emitting element.

7. The electronic device of claim 1, further comprising a polymer structure that surrounds the polymer member, the conductive member and the heat radiating member.

8. An electronic device comprising:
a housing;
a window arranged in at least a partial region of the housing;
a display module attached to a rear surface of the window;
a first member arranged in a rear surface of the display module;
a second member arranged in a rear surface of the first member; and
a third member arranged between the first member and the second member, and waterproofed by at least one member of the first member or the second member.

9. The electronic device of claim 8, wherein at least one of the first member or the second member comprises at least one of a tape, a flexible printed circuit board (FPCB), a glue agent, a sponge, urethane, a thin film metal, a thin film plastic sheet, a urethane film or a polyethylene terephthalate (PET) film.

10. The electronic device of claim 8, wherein the third member comprises at least one of an added display, a force touch FPCB, a fingerprint scan sensor FPCB, a communicating antenna radiator, a heat radiating sheet, a conductive/non-conductive tape, an open cell sponge or a graphite sheet.

11. The electronic device of claim 8, wherein at least one of the first member and the second member apply a member having relatively superior waterproof performance than the third member, and the third member is waterproofed by a junction structure between the first member and the second member.

12. The electronic device of claim 11, wherein the third member is smaller in size than the first member and the second member, and the junction structure joins along edges of the first member and the second member except for the third member.

13. The electronic device of claim 11, wherein the first member and the second member are joined to each other by at least one of ultrasonic fusion, pressing, bonding or a separate adhesive means.

14. The electronic device of claim 11, wherein the junction structure is configured such that the first member or the second member detours to surround a side surface of the third member and is joined to a remnant second member or first member.

15. The electronic device of claim 11, wherein the junction structure is configured such that a waterproof member is arranged to at least comprise a side surface region of the third member.

16. The electronic device of claim 15, wherein the waterproof member comprises at least one of a taping member, a curing agent or a glue agent that is arranged to surround at least an entire side surface of the third member.

17. The electronic device of claim 8, wherein the first member comprises a sponge for absorbing, and the second member comprises a conductive sheet for heat radiating and noise shielding, and the third member comprises graphite for emitting heat that is generated by a heat emitting element arranged around the third member.

18. The electronic device of claim 8, further comprising an electromagnetic resonance (EMR) sensor pad that is arranged below the display module and operates in an electromagnetic induction scheme to detect an input of an electronic pen.

19. The electronic device of claim 8, wherein the first member, the third member, and the second member are sequentially laminated and attached to the rear surface of the display module by an adhesive agent.

20. An electronic device comprising:
a housing;
a window arranged in at least a partial region of the housing;
a display module attached to a rear surface of the window;
an absorbing member attached to a rear surface of the display module;
a graphite member for heat radiation, attached to a rear surface of the absorbing member; and
a copper member arranged beneath the graphite member, and joined to at least a part of the absorbing member,
wherein the graphite member is configured to have a waterproof structure that prevents infiltration of external moisture by a junction structure between the absorbing member and the copper member.

* * * * *